United States Patent [19]
Zank et al.

[11] Patent Number: 5,122,623
[45] Date of Patent: * Jun. 16, 1992

[54] ELECTROMAGNETIC POSITION TRANSDUCER HAVING ACTIVE TRANSMITTING STYLUS

[75] Inventors: Anthony E. Zank, Simi Valley; Michael N. Gilano, Irvine; Kenneth S. Gold, Bell Canyon; H. Maurice France, Palos Verdes Estates, all of Calif.

[73] Assignee: Gazelle Graphic Systems Inc., Irvine, Calif.

[*] Notice: The portion of the term of this patent subsequent to Jun. 9, 2009 has been disclaimed.

[21] Appl. No.: 667,604

[22] Filed: Mar. 8, 1991

Related U.S. Application Data

[63] Continuation-in-part of Ser. No. 607,537, Nov. 1, 1990, Pat. No. 5,120,908.

[51] Int. Cl.⁵ .................................................. G08G 21/00
[52] U.S. Cl. .................................................. 178/19
[58] Field of Search ...................... 178/18, 19; 340/706

[56] References Cited

U.S. PATENT DOCUMENTS

| | | | |
|---|---|---|---|
| 3,975,592 | 8/1976 | Carvey | 178/18 |
| 4,088,842 | 5/1978 | Ikedo | 178/19 |
| 4,210,775 | 7/1980 | Rodgers et al. | 178/19 |
| 4,213,005 | 7/1980 | Cameron | 178/18 |
| 4,216,352 | 8/1980 | Chamuel | 178/19 |
| 4,273,954 | 6/1981 | Takeuchi et al. | 178/19 |
| 4,289,927 | 9/1981 | Rodgers | 178/19 |
| 4,368,351 | 1/1983 | Zimmer | 178/19 |
| 4,492,819 | 1/1985 | Rodgers et al. | 178/19 |
| 4,507,523 | 3/1985 | Gohara et al. | 178/19 |
| 4,582,955 | 4/1986 | Blesser | 178/19 |
| 4,645,869 | 2/1987 | Rockwell et al. | 178/19 |
| 4,653,086 | 3/1987 | Laube | 379/96 |
| 4,786,765 | 11/1988 | Yamanami et al. | 178/19 |
| 4,810,838 | 3/1989 | Ichinokawa et al. | 178/19 |
| 4,818,826 | 4/1989 | Kimura | 178/19 |
| 4,831,216 | 5/1989 | Landmeier | 178/19 |
| 4,841,290 | 6/1989 | Nakamo et al. | 340/207 |
| 4,848,496 | 7/1989 | Murakami et al. | 178/19 |
| 4,855,538 | 8/1989 | Grinschgl et al. | 178/18 |
| 4,868,351 | 9/1989 | Watanabe et al. | 178/19 |
| 4,890,096 | 12/1989 | Taguchi et al. | 340/712 |
| 4,910,363 | 3/1990 | Kobayashi et al. | 178/18 |
| 4,918,263 | 4/1990 | Grinschgl et al. | 178/19 |

OTHER PUBLICATIONS

"Introduction to Graphic Digitizers" by W. Creitz and G. Helser; GTCO Corporation, Columbia, Md.; Title page, pp. 3-43; 1986.

*Primary Examiner*—Stafford D. Schreyer
*Attorney, Agent, or Firm*—Sheldon & Mak

[57] ABSTRACT

Disclosed is electromagnetic transducer that does not require complex analog to digital, digital to analog converters, microprocessors or large memory circuitry. The transducer has a helical tablet coil with tap nodes spaced between its end extremities. In one configuration, an oscillator drives the tablet coil for simultaneously producing oppositely directed currents on opposite sides of selected taps, creating a moving fringing field that is compatible with modern graphic display tablet technology. A control circuit of the transducer has a closed-loop integrator for detecting the centroid of a received stylus signal from a stylus coil. Analog and digital versions of the integrator are disclosed. In another configuration, the oscillator drives the stylus coil for variably coupling magnetic flux to the tablet coil, a receiver signal that is coupled from the end extremities being responsive to the position of the stylus coil and the taps selected. A preferred configuration of the tablet coil has separate oppositely wound coil components.

50 Claims, 7 Drawing Sheets

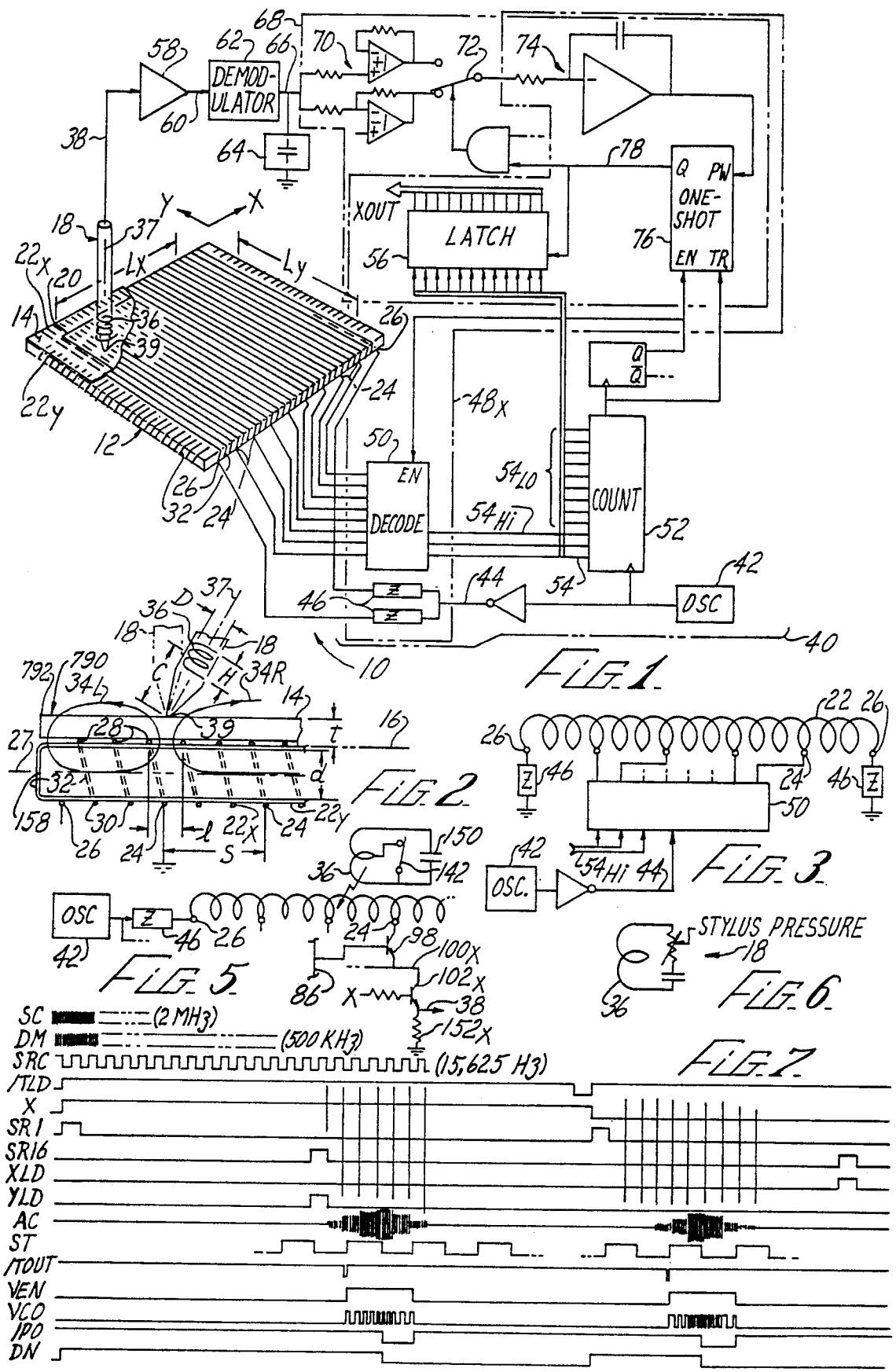

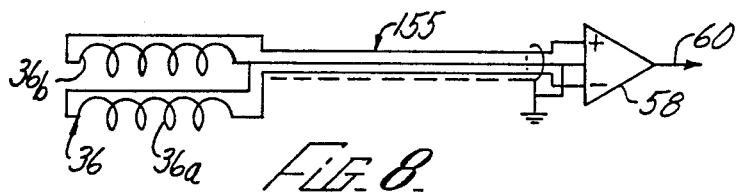
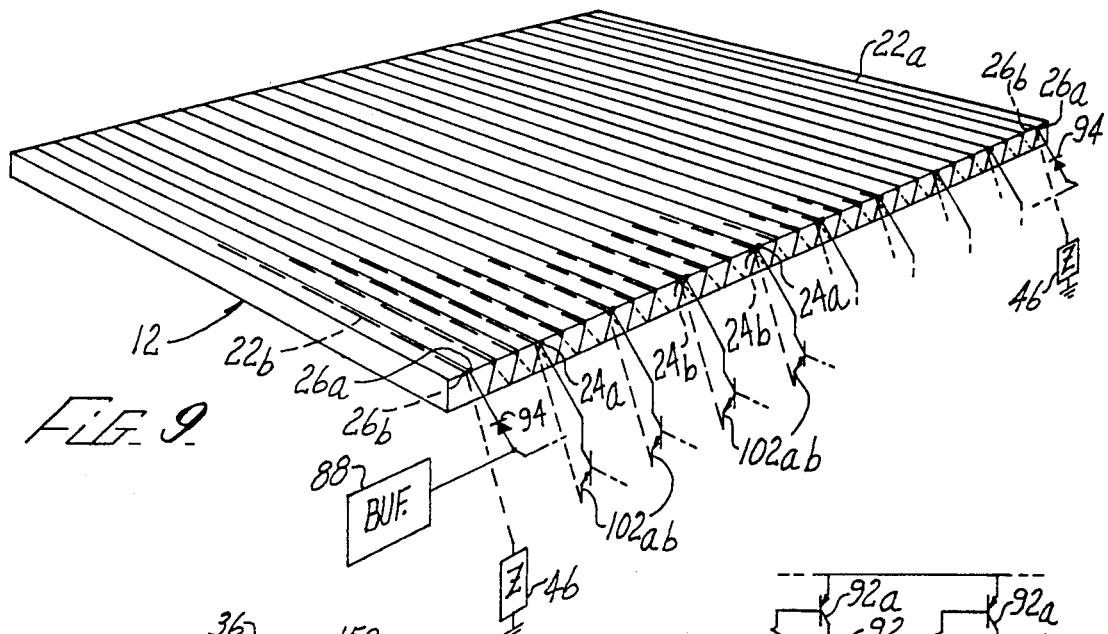
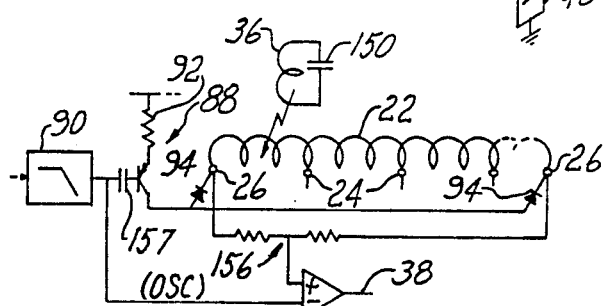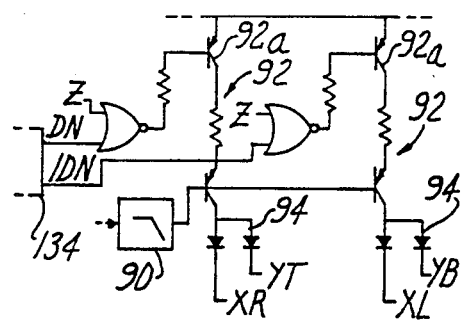

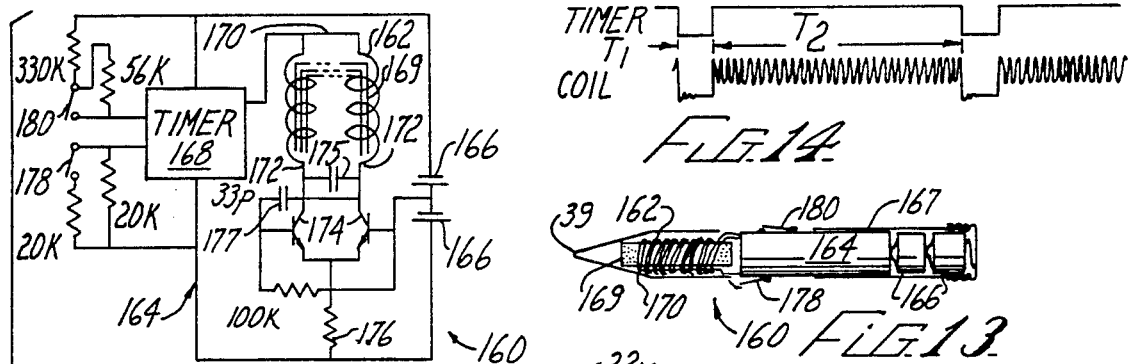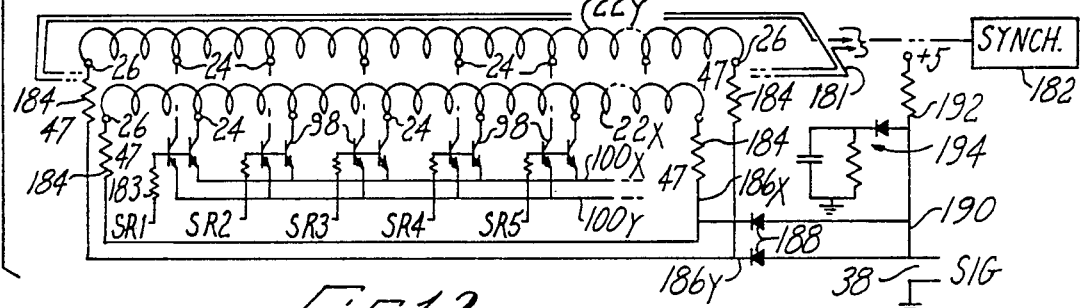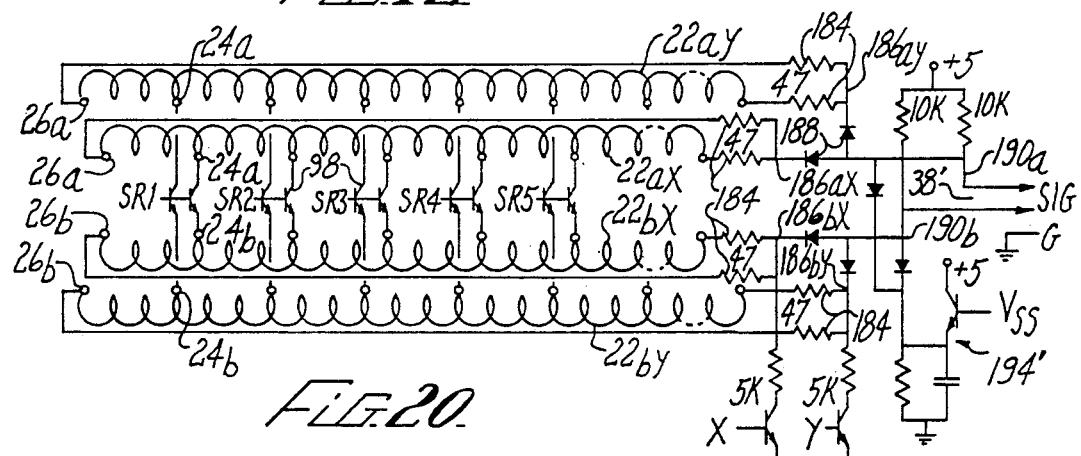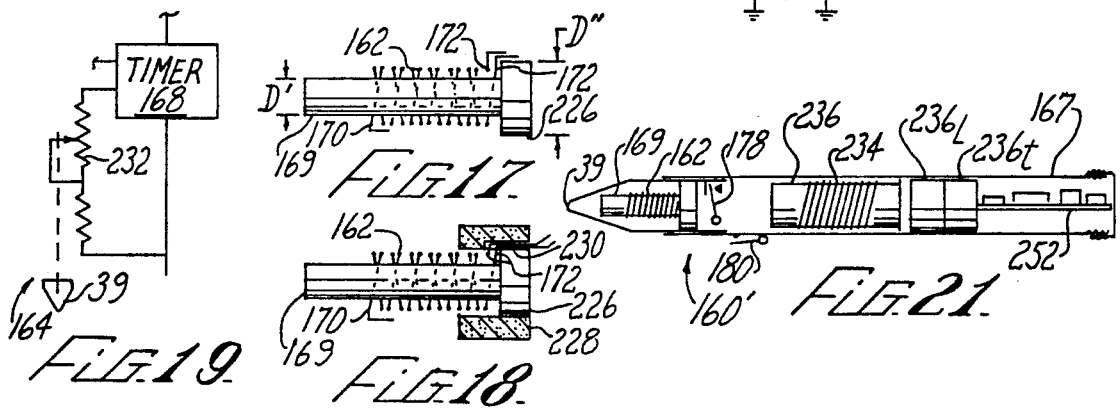

ELECTROMAGNETIC POSITION TRANSDUCER HAVING ACTIVE TRANSMITTING STYLUS

RELATED APPLICATION

This application is a continuation-in-part of application Ser. No. 07/607,537, filed on Nov. 1, 1990, now U.S. Pat. No. 5,120,908, issued Jun. 9, 1991, which is incorporated herein by this reference. The subject matter of this application and the prior application have at all times shared common ownership, the applications having been assigned to the same assignee.

BACKGROUND

The present invention relates to position transducers such a graphic tablets and the like for inputting absolute coordinate data to complex control systems and other electronic equipment.

Position input devices such as joysticks, track-balls, and "mice" are commonly used for feeding incremental data to a computer in response to an operator's hand movements, the operator usually adjusting the movements while observing a screen display of the computer. In some important applications, it is desired to feed coordinates that are directly measured from an existing exhibit such as a drawing. In these applications the incremental input devices have major shortcomings regarding both scale factor and position reference.

Accordingly, a variety of graphic tablets have been developed for generating computer position data from a workpiece such as a drawing. Typical graphic tablets of the prior art provide absolute position data relative to a fixed or adjustable reference, the data being generated in response to a stylus that is moved by the operator over the drawing surface. Among the important performance parameters of such transducers are accuracy, repeatability, resolution in both distance and time, range, limiting speed, and ease of operation. Also important are cost, reliability, and compatibility with related systems such as graphic displays.

An important class of graphic tablet incorporates an orthogonal pair of conductor patterns within the tablet. The stylus carries a coil from which a stylus signal is generated. See for example, U.S. Pat. No. 3,975,592 to Carvey, which discloses an array of the conductors in each pattern, the conductors being sequentially energized for producing corresponding electric fields, one of the fields being detected by the stylus for determining a coarse position of the stylus, after which a subset of the conductors is energized at a different rate. In successive cycles of the sequential energization, a sampled counterpart of the stylus signal is integrated positively, then negatively at double amplification. A counter is latched when the integration output reaches zero, the latched counter value being intended to represent the centroid of the detected signal relative to the coarse position. However, latched counter values fail to indicate the real-time centroid of the stylus signal in that computations based on successive samples are employed, the results being subject to error when there is movement of the stylus between samples. Also, cumbersome and expensive sample-and-hold circuitry is required.

Another problem with such systems is that the detected field strength between the coarse positions is non-linear. U.S. Pat. No. 4,088,842 to Ikedo discloses nonlinear interpolation for detecting intermediate positions of the stylus in a system having the stylus excited and an array of planar pick-up coils in the tablet. Nonlinear interpolators, however, are undesirably complex, expensive to produce, and limited in accuracy. In fact, most electromagnetic coordinate tablets of the prior art require sophisticated signal processing by complex and expensive analog to digital and digital to analog converters, microprocessors, and computer memory. Further, most such tablets use strictly 2-dimensional conductor patterns that are expensive to produce, even with printed circuit techniques. Also, in order to avoid expensive interpolation errors, very fine coarse resolution is resorted to, with consequent added circuit complexity and cost.

It is also known to provide a transmitter coil in the stylus as disclosed in the '842 patent to Ikedo, and in U.S. Pat. No. 4,210,775 to Rodgers et al., which discloses a grid of conductors that is sequentially scanned using a counter for producing an output signal. The leading edge of a pulse that is a filtered counterpart of the output signal halts the counter, thereby producing the position signal.

Another class of coordinate reading devices utilizes magnetorestrictive material as a vibration transmission media. See, for example U.S. Pat. Nos. 4,216,352 to Chamuel and 4,273,954 to Takeuchi et al. These and similar systems are subject to the limitations of accurately measuring or converting from full scale analog values.

If is often desirable to combine a graphic display capability in a coordinate position transducer. Unfortunately, however, some display devices can be adversely affected by strong electromagnetic fields such as are produced by typical coordinate transducers. Also, magnetorestrictive materials such as used in some coordinate tablets are opaque, thus preventing the use of backlighting, etc.

Thus there is a need for a position transducer that provides high accuracy, repeatability, range and resolution, that is easy to operate, reliable and inexpensive to produce, yet is compatible with low-cost graphic computer and display devices.

SUMMARY

The present invention is directed to an electromagnetic transducer that meets this need without requiring complex analog to digital, digital to analog converters, microprocessors or large memory circuitry. The transducer includes a helical electrically conductive tablet coil having a plurality of coil turns between first and second end extremities, and a plurality of coil tap nodes spaced between the end extremities; selector means for sequentially addressing selected ones of the coil tap nodes; a transducer body movable in a first transducer direction relative to the tablet coil and having a stylus coil fixedly mounted thereto; oscillator means for producing a coil drive current in one of the tablet coil and the stylus coil whereby a magnetic field is coupled between the tablet coil and the stylus coil; and circuit means connected to the selector means and operatively responsive to movement of the stylus coil in the first direction for providing a first position signal representing a distance between the transducer body and the tablet coil in the first direction, the distance being measurable relative to a first position reference that is perpendicular to the first direction. Preferably the tablet coil includes a pair of oppositely helically wound coil components, the selector means sequentially connecting the coil components at corresponding ones of the coil tap nodes. The oscillator means can be connected to the tablet coil for producing the magnetic field as a fringing field extending from proximate the selected tap node in response to current flow in opposite directions between the node and the opposite end extremities. The oppositely wound coil component configuration advantageously suppresses stray magnetic fields by cancellation when the oscillator feeds the tablet coil.

The tablet coil can include first and second trace layers, the first trace layer having a parallel spaced array of front coil portions, the second trace layer having a parallel spaced array of rear coil portions, alternate ones of the coil portions forming equally spaced portions of each of the oppositely wound coil components, each front coil portion being aligned with a rear coil portion of an oppositely wound coil component. The transducer can also include an array of conductive elements connecting the front coil portion to a corresponding rear coil portion of the same coil component, the conductive elements forming side coil portions of each of the coil components. Adjacent pairs of the conductive elements can include corresponding tap nodes of the oppositely wound coil components.

An important feature of the present invention is that the oscillator means can be connected to the stylus coil rather than the tablet coil for magnetically coupling a stylus field to the tablet coil, this magnetic coupling forming a duality of the fringing field that is produced when the oscillator drives the tablet coil directly. In this configuration, the circuit means includes a receiver node which is electrically coupled to the end extremities of the tablet coil, a receiver signal at the receiver node being responsive to the magnitude of the stylus field at the tablet coil. Preferably the tablet coil includes the pair of oppositely helically wound coil components, the selector means sequentially connecting the coil components at corresponding ones of the coil tap nodes. This configuration wherein the oscillator feeds the stylus coil advantageously avoids extraneous voltage pick-up at the tap node connections.

The circuit means can include a balanced differential input amplifier, end extremities of the tablet coil components being coupled to complementary counterparts of the receiver node for feeding the amplifier, the amplifier rejecting stray electrical noise. The counterparts of the receiver node can be coupled to respective end extremities of the coil components by corresponding diodes. Dual-axis position measurements can be performed in alternating axis intervals, the end extremities of respective first and second tablet coils being coupled to the differential amplifier through diode isolators.

The transducer also preferably includes an auxiliary coil proximately enclosing the tablet coil for providing an auxiliary signal in response to magnetic coupling from the stylus field. The transducer can further include means for synchronizing the circuit means to the auxiliary signal. The oscillator means can be is located within the transducer body, the transducer further including means for periodically driving the auxiliary coil at a power frequency; power receiver means in the transducer body for powering the oscillator means by magnetic coupling from the auxiliary coil; and means for periodically interrupting the power driver means for reception of the auxiliary signal.

The power receiver means can include a power coil, rectifier means, filter means connected between the rectifier means and the oscillator means, and coupling means coupled between the power coil and the rectifier means, the coupling means being resonant with the power coil at the power frequency for canceling a reactance of the power coil at the power frequency. The power driver means can include a complementary pair of driver transistors for sequentially switching a power node between a power bus voltage and ground at the power frequency; a gated clock generator circuit for separately controlling the driver transistors, the generator circuit including means for delaying activation of each of the driver transistors for a predetermined delay period following deactivation of the other driver transistor; and a coupling capacitor connected between the coupling node and the auxiliary coil, the coupling capacitor being resonant with the auxiliary coil for canceling a reactance of the auxiliary coil at the power frequency. The power frequency can be between approximately 10 KHz and approximately 10 MHz. Preferably the power frequency is between approximately 20 KHz and approximately 100 KHz. More preferably, the power frequency is between approximately 25 KHz and approximately 50 KHz.

Threshold means can be included for detecting a predetermined magnitude of the receiver signal, the threshold means providing a valid signal when the transducer body is aligned within a predetermined distance from the transmitter coil. The oscillator circuit can be operable in a burst mode having a burst duty cycle that is less than approximately 20 percent for conserving electrical power. The burst mode can be terminated for at least a predetermined period of time upon occurrence of the valid signal.

Preferably the circuit means further includes integrator means for summing a first-polarity component of the receiver signal during a first cycle interval and for summing an opposite-polarity component of the receiver signal during a second cycle interval for locating a centroid of the receiver signal, the circuit means also having latch means for latching a variable position signal that is representative of the location of the sequentially connected coil tap nodes along the transmitter coil, and feedback means for activating the latch means at the receiver signal centroid in response to the integrator means, the first cycle interval terminating and the second cycle interval commencing upon activation of the latch means. The variable position signal can be generated by an N-state counter, N being a multiple M of the number of the coil tap nodes of the transmitter coil, the selector means decoding the N-state counter for connecting each of the coil tap nodes to the oscillator means during an interval group number of counter states, the interval group number corresponding to the multiple M.

The integrator means can include a bidirectional counter and a variable frequency oscillator, the frequency of the variable frequency oscillator being responsive to the magnitude of the receiver signal.

The transducer coil can be cylindrically helical about a coil axis that is parallel to the first transducer direction, including front and back portions on opposite sides of the coil axis, the transducer further including means for guiding the body at a predetermined probe distance from the front portion of the coil. Preferably the front and back portions of the transducer coil are spaced part by a winding distance d, the distance d being at least approximately 0.03 inches for avoiding undesirable magnetic flux concentration at the coil end extremities. Preferably the turns of the transmitter coil are substantially uniformly spaced for defining a constant scale factor of the transducer.

The stylus coil can be cylindrically symmetrical about a stylus axis, the transducer body defining a stylus point on the stylus axis, the stylus point moving at the probe distance from the front portion of the coil. Preferably, the coil turns are spaced in the direction of the coil axis by a uniform turn spacing. Preferably a central point within the stylus coil on the stylus axis is offset by a coil distance from the stylus point, the coil distance being approximately 0.4 inch for permitting uniform operation of the transducer within a range of inclinations of the stylus axis relative to orthogonal alignment with the front portion of the coil. Preferably the transducer also includes means for gating the circuit means, whereby the circuit means is responsive to the receiver coil during a limited sample interval during which a subset of the coil tap nodes are activated by the selector means for enhancing the uniformity of operation over the range of inclinations of the receiver axis. More preferably, the duration of the sample interval is approximately equal to the time during which four of the coil tap nodes are selected by the selector means. The stylus coil can include a pair of stylus coil components.

The front coil portion can be substantially planar, the means for guiding the body including a planar tablet surface for slidably supporting the body. The tablet coil can be a first coil, the transducer including a second tablet coil that is orthogonally supported relative to the first tablet coil. An electronic graphic display unit can be included for forming the tablet surface. The display unit can be visually responsive to movement of the transducer body relative to the tablet surface. The front portions of the tablet coils can be substantially coplanar.

Preferably the transmitter coil has a plurality of the turns between each of the coil tap nodes for concentrating the fringing field.

In another aspect of the present invention, a method is disclosed for measuring a coordinate position, including the steps of:

(a) providing a helical tablet coil having end extremities and a plurality of coil tap nodes spaced between the end extremities;

(b) locating a stylus coil at the coordinate position for producing a receiver signal responsive to the fringing field;

(c) driving the transmitter coil with an AC signal for producing electrical current in the coil;

(d) sequentially selecting a plurality of the coil tap nodes for producing a moving fringing field; and (e) detecting a centroid position of the receiver signal, the centroid position being representative of the coordinate position.

The movable member can be a first movable member, the method including the further steps of:

(a) modulating a second timer interval during which the oscillator is operational in response to a second movable member on the transducer body;

(b) monitoring the second timer interval for detecting a position of the second movable member. The method can also include the steps of:

(a) periodically interrupting the AC oscillator;

(b) modulating a first timer interval during which the oscillator is interrupted in response to a movable member on the transducer body; and (c) monitoring the first timer interval for detecting a position of the movable member.

The method can include the further step of powering the AC oscillator by magnetic coupling to the transducer body during the first timer interval.

In a further and important aspect of the present invention, a position transducer having a stylus that is wirelessly coupled to a tablet circuit, the tablet circuit being responsive to movement of the stylus relative thereto, the stylus including timer means and means for synchronizing the tablet circuit in response to the timer means. The tablet circuit can be operative for generating respective X and Y coordinate measurements of the position of the stylus in corresponding scan intervals, the scan intervals being sequentially initiated in response to the timer means.

The stylus can further include auxiliary control circuit means, the timer means being responsive to the auxiliary control circuit means, the tablet circuit including means for generating at least one auxiliary output in response to the timer means, the auxiliary output corresponding to operation of the auxiliary control circuit means. The auxiliary control circuit means can include at least one operator controlled switch on the stylus. The stylus can have a body and a stylus point, the operator-controlled switch being responsive to axial pressure against the stylus point.

DRAWINGS

These and other features, aspects, and advantages of the present invention will become better understood with reference to the following description, appended claims, and accompanying drawings, where:

FIG. 1 is a combination perspective and simplified schematic diagram of position transducer apparatus according to the present invention;

FIG. 2 is a sectional view showing a magnetic field configuration of the apparatus of FIG. 1;

FIG. 3 is a schematic diagram showing an alternative configuration of a portion of the apparatus of FIG. 1;

FIG. 5 is a schematic diagram showing an alternative configuration of a circuit portion of the apparatus of FIG. 4;

FIG. 6 is a schematic diagram of an alternative configuration of a portion of the circuit of FIG. 5;

FIG. 7 is a timing diagram for the apparatus of FIG. 4;

FIG. 8 is a schematic diagram of an alternative configuration of a portion of the circuit of FIG. 1;

FIG. 9 is a combination perspective and simplified schematic diagram of a portion of the apparatus of FIG. 1;

FIG. 10 is a simplified schematic diagram showing an alternative configuration of a circuit portion of the apparatus of FIG. 4;

FIG. 11 is a schematic diagram shown an alternative configuration of a portion of the circuit of FIG. 4;

FIG. 12 is a circuit schematic showing an alternative configuration of a portion of the apparatus of FIG. 4;

FIG. 13 is a fragmentary sectional side view of a portion of the apparatus of FIG. 12;

FIG. 14 is a timing diagram of the apparatus portion of FIG. 13;

FIG. 15 is a pictorial schematic diagram showing details of the circuit of FIG. 12;

FIG. 16 is a timing diagram showing operation of the circuit portion of FIG. 15;

FIG. 17 is a fragmentary sectional detail view showing a portion of the apparatus of FIG. 13;

FIG. 18 is a fragmentary sectional detail view as in FIG. 17 showing another alterative configuration of the apparatus portion of FIG. 18;

FIG. 19 is a schematic diagram showing an alternative configuration of a portion of the circuit of FIG. 12;

FIG. 20 is a circuit diagram showing an alterative configuration of another portion of the circuit of FIG. 12;

FIG. 21 is a fragmentary sectional side view of an alternative configuration of the apparatus of FIG. 13;

FIG. 22 is a circuit diagram of a portion of the apparatus of FIG. 21;

FIG. 23 is circuit diagram showing an alternative configuration of the circuit portion of FIG. 15;

FIG. 24 is a timing diagram for the circuit portion of FIG. 23;

DESCRIPTION

Figure 4:
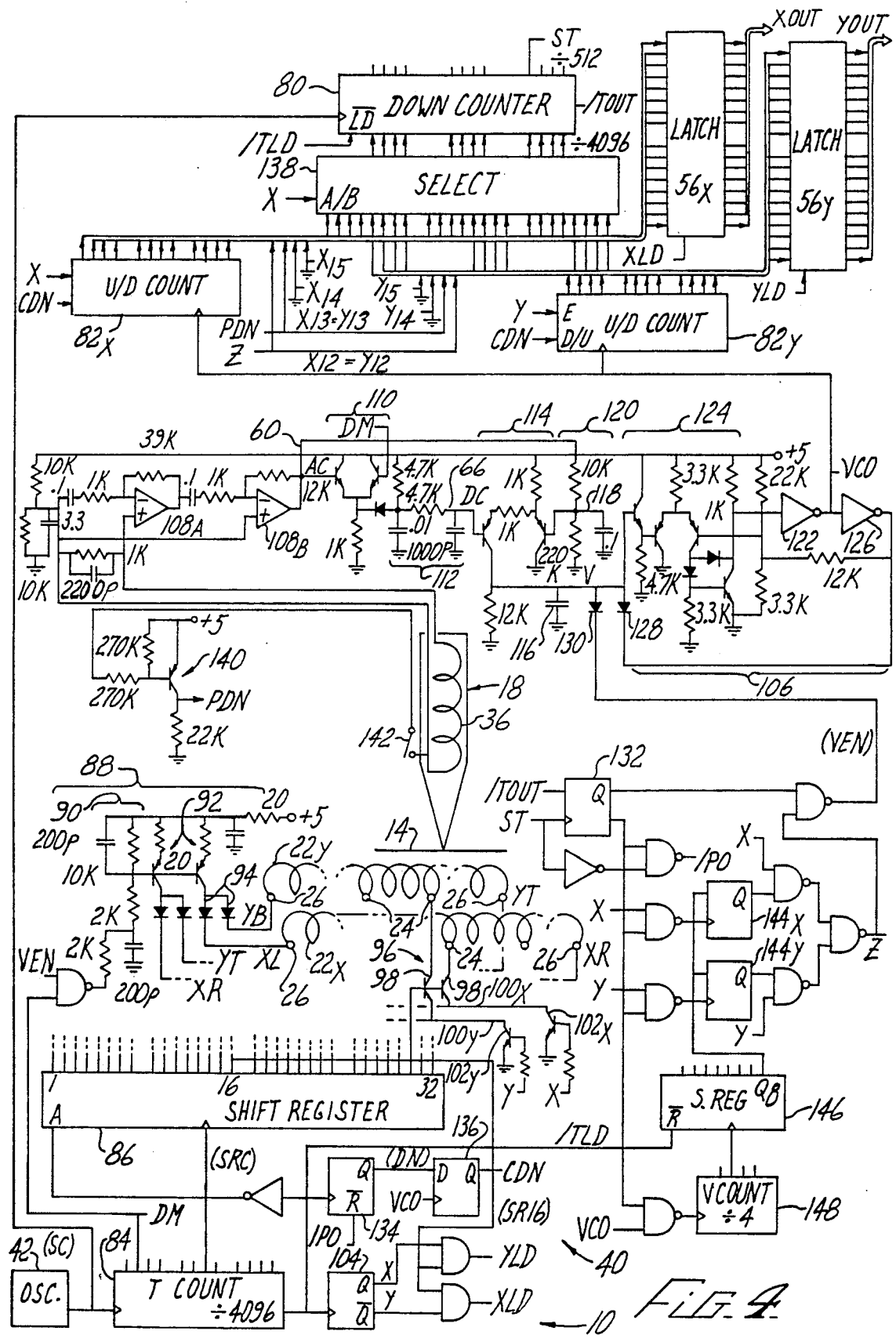
FIG. 4 is a schematic diagram showing an alternative configuration of the apparatus of FIG. 1.

The present invention is directed to an electromagnetic transducer, an exemplary configuration of which forms a graphic tablet that provides digital coordinate data for a computer or similar system in response to operator control. With reference to FIGS. 1 and 2 of the drawings, a transducer apparatus 10 according to the present invention includes a 3-dimensional coil assembly 12, a tablet surface 14 being supported in fixed parallel relation to a major coil plane 16 of the coil assembly 12 for movably supporting a stylus assembly 18 at a predetermined tablet distance t from the major coil plane 16. The tablet surface 14, as further described below, can receive a drawing 20 or the like, the stylus assembly 18 being manually movable upon features of the drawing 20 for measurement thereof.

The coil assembly 12 includes a pair of helical coils 22, designated $22_X$ and $22_Y$, each of the coils 22 having a plurality of taps 24 and a pair of end extremities 26. As used herein, the term "helical" is used in its broad sense, meaning generated by a point that moves with a distance component parallel to a line, the distance component increasing in one direction only as the point orbits the line, the point advancing a minimum distance in the parallel direction for each orbit of the line. In a preferred configuration of the coils 22 as depicted in the drawings, the coils 22 are also cylindrical in that the turns of each coil lie on a surface that is generated by a line that moves parallel to a stationary line or coil axis 27. The turns of each coil 22 each have a top portion 28 substantially in the coil plane 16 and a bottom portion 30 uniformly spaced below the coil plane 16, the coil axis 27 being located midway between the top and bottom portions 28 and 30, the portions 28 and 30 being spaced apart by a coil depth d. The top portions 28 are parallel and uniformly spaced apart by a turn spacing l, each of the bottom portions 30 being located midway between neighboring top portions 28 and parallel thereto. Each coil 22 also includes a plurality of obliquely oriented side portions 32 that serially connect the top and bottom portions 28 and 30. The top portions 28 and the bottom portions 30 of the respective coils $22_X$ and $22_Y$ are orthogonal for permitting independent measurement of corresponding X and Y position coordinates of the stylus assembly 18, X and Y coordinate directions being indicated by the arrows in FIG. 1.

The taps 24 are preferably provided at the edges of at least some of the coil bottom portions 30. In the configuration of FIGS. 1 and 2, every third bottom portion 30 of each coil 22 has one of the taps 24, the taps 24 having a tap spacing $S = 3l$. By having the taps 24 spaced on a subset only of the turns of the coils 22, the apparatus 10 is advantageously simplified, there being a trade-off between resolution and circuit complexity. It will be understood that where maximum resolution is needed, the taps 24 would be on each turn of the coil 22. As best shown in FIG. 2, adjacent turns of the coils 22 on opposite sides of the taps 24 produce an electromagnetic fringing field 34, having right and left flux paths 34R and 34L, when energized as described herein, the field 34 being concentrated between adjacent ones of the top portions 28 on opposite sides of a selected one of the taps 24. A stylus coil 36 is provided within the stylus assembly 18, the coil 36 being concentric with a stylus axis 37 of the assembly 18. The stylus coil 36 is responsive to the fringing field 34 for producing a stylus signal 38, also further described herein, when a stylus point 39 that is formed on the axis 37 at a lower extremity of the stylus assembly 18 is in proximate contact with the tablet surface 14.

With particular reference to FIG. 1, the coil assembly 12 and the stylus assembly 18 are connected to a feedback control circuit 40 of the apparatus 10. The control circuit 40 includes an oscillator 42 for AC drive of each of the coils 22, a buffered output 44 from the oscillator 42 being connected to each of the end extremities 26 of the coils 22 through a suitable passive coil terminator 46, a pair of the terminators 46 being included in an X axis portion $48_X$ of the control circuit 40 for driving the coil $22_X$. The control circuit 40 also includes a Y axis counterpart $48_Y$ (not shown) of the circuit portion $48_X$. The taps 24 of each coil 22 are sequentially driven by a demultiplexer or decoder 50 that is included within the axis portion $48_X$ for driving a selected one of the taps 24 to a reference or ground potential, outputs of the decoder 50 having appropriate power handling capacity for passing a desired level of current through the coil assembly 12. The fringing field 34 is thus produced by electrical current that flows to the selected tap 24 in opposite directions from the end extremities 26 of the associated coil 22. The purpose of the terminators 46 is to reduce high frequency electromagnetic radiation from the coils 22 by filtering harmonics from the current of the buffered output 44 from the oscillator 42. Also, the output 44 can be a conveniently obtained square wave voltage, with a substantially sine-wave current profile being produced in the coil 22. The terminators 46 also serve to balance the current in the coil 22, equalizing the current between the selected tap 24 and the opposite end extremities 26.

With further reference to FIG. 3, an alternative configuration of the control circuit 40 has the oscillator 42 being selectively connected to the taps 24 through the decoder 50, the coil terminators 46 being connected to a reference such as ground as depicted in FIG. 3. The fringing field 34 in this alternative configuration has the same form as described above in connection with FIG. 2 because the current distribution in the coil 22 is the same except for flowing in opposite directions from the case of the circuit configuration of FIG. 1. Advantageously, the configuration of FIG. 1 permits the decoder 50 to be arranged more simply than for the alternative configuration, being required only to sink current at ground potential from the selected tap 24.

The oscillator 42 also provides timing for the control circuit 40, the oscillator output 42 clocking a binary counter 52 having a plurality of counter outputs 54 in two groups. The most significant counter outputs, designated $54_{Hi}$, drive corresponding inputs of the decoder 50 for sequentially selecting the taps 24, whereby the fringing field 34 is caused to move stepwise along each of the coils 22. The counter outputs $54_{Hi}$, together with the other counter outputs, designated $54_{Lo}$, are also fed to a latch circuit 56 for storing X coordinate data that is produced by the apparatus 10 as described herein.

As indicated above, the stylus signal 38 is responsive to the fringing field 34 according to the position of the stylus assembly 18 relative to the coil assembly 12. The stylus signal 38 is fed to a stylus amplifier 58, from which an AC sensor output 60 is connected to a demodulator 62 and low-pass filter 64 for producing a DC sensor output 66 for driving a closed-loop centroid null circuit 68 according to the present invention. The null circuit 68 includes a phase splitter 70, a polarity selector 72, an integrator amplifier 74, a one-shot or timer 76 having a latch output 78, and the latch circuit 56, the coordinate data present at the latch circuit 56 being stored therein upon activation of the latch output 78. The integrator amplifier 64 and the timer 76 are also included with the latch circuit 56 in the axis portion $48_X$ of the control circuit 40. The polarity selector 72 feeds the integrator amplifier 74 alternately with in-phase and inverted counterparts of the DC sensor output 66, also in response to the latch output 78 of the timer 76, the timing duration of the timer 76 being variable in response to the output of the integrator amplifier 74. Operation of the polarity selector 72 by the timer 76 is such that the signal to the integrator amplifier 74 is balanced about a null reference level, the latch output 78 being activated in successive integration cycles of the null circuit 68 for latching the coordinate data and reversing the direction of integration at the centroid of the DC stylus signal 66.

Once latched, and until the next integration cycle, the latch 56 holds a binary representation of the position of the stylus assembly 18 relative to the end extremity 26 adjacent to the first-selected tap 40 of the coil 22. In continuing operation of the control circuit 40, the axis portions $48_X$ and $48_Y$ alternately store the X and Y coordinate positions of the stylus assembly 18.

An important advantage of the coil assembly 12 of the present invention is that the centroid location of the stylus signal 38 is a highly linear function of the coordinate position of the stylus point 39 on the stylus surface 14 relative to the position of the selected tap 24. As the stylus point 39 approaches the selected tap 24, the amplitude of the stylus signal 38 increases linearly until the point 39 passes above the tap 24, then the signal 38 symmetrically decreases as the point continues away from the tap 24. Thus there is no need for complex non-linear interpolation hardware or software in the present invention. Whereas the uncompensated linearity between coarse positions of typical prior art tablet transducers having planar conductor patterns is only about 50%, the coil assembly 12 of the present invention provides a linearity of approximately 1% or better between adjacent taps 24.

The coil assembly 12 can advantageously incorporate a graphic display unit 790 that forms the tablet surface 14, the display unit 790 having a flat display panel 792 that provides, for example, a visual display of the path of the stylus point 39 on the tablet surface 14. The fringing field 34 penetrates the display panel 792 without interfering with electronics therein, and the apparatus 10 can include or operate in conjunction with a metalized or electro-luminescent backlight assembly (not shown). Advantageously, special shielding is not required between the display panel 792 and other components of the apparatus 10, because the field 34 is of the fringing type. Most of the field 34 is contained within the coil assembly 12, and the lack of special shielding allows the control circuit 40 and other electronics to be located immediately behind or in the same plane as the coil assembly 12 along one edge thereof.

Several methods exist for minimizing stray electromagnetic fields around the tablet periphery or underside. These include shielding of current return wires, placing return wires on the back side of the tablet, returning the current through "return" helixes overlayed on the primary helix, and dividing the return current equally between driven return helixes. This helix return method substantially reduces stray current flow. Other current return options include multiplexing current flow in the tablet to be non-simultaneous, controlled by fixed timing or by variable timing tied to the position of the stylus pick-up. These methods, used singly or in combination, are effective for enlarging the useful area of the transducer 10, and for avoiding undesirable interference with other nearby electronic equipment. One particularly advantageous alternative configuration of the coil 22 is described below in connection with FIG. 9.

With further reference to FIG. 4, an alternative configuration of the control circuit 40 has the null circuit 68 of FIG. 1 implemented digitally. In an exemplary and preferred digital configuration, the timer 76 is replaced by a down-counter 80 that is clocked directly by the oscillator 42 and periodically loaded with position data; the integrator amplifier 74 is replaced by respective up/down counters 82, designated $82_X$ and $82_Y$ in FIG. 4, the counters 82 generating the position data for the down-counter 80; and the polarity selector 72 is replaced by direction controls CDN for the up/down counters 82. A clock divider 84 replaces the binary counter 52, the divider 84 being operated at 2.0 MHz by a system clock signal SC from the oscillator 42, the divider 84 having a demodulator output DM at 500 KHz for operating a synchronous demodulator (described below) and for driving the coils 22 as described below. The divider 84 also generates a shift register clock SRC at a submultiple of the DM output frequency, and a carry or timer load output /TLD at a submultiple frequency of the clock SC. Also, the decoder 50 is replaced by a coil drive shift register 86, the shift register 86 being clocked at 15,625 Hz by the clock SC of the clock divider 84. A single bit of the shift register 86 is periodically activated at approximately 2 ms intervals by the output /TLD of the clock divider 84, the other bits of the shift register 86 being sequentially activated in successive cycles of the clock SC. In the exemplary configuration of FIG. 4, there are 32 outputs of the shift register 86 for sequentially activating up to 32 of the taps 24 of each of the coils 22.

A coil buffer circuit 88 receives the DM output (square wave) from the clock divider 84, the buffer circuit 88 including a low-pass filter 90 and a pair of current waveform drivers 92 for producing an approximately sine-wave current into the opposite end extremities 26 of the tablet coils 22. A pair of steering diodes 94 is provided at each of the current drivers 92 for isolating the end extremities 26 of the tablet coils $22_X$ and $22_Y$.

A tap driver circuit 96 is connected between the taps 24 of the tablet coils 22 and the outputs of the shift register 86 for sinking to ground the coil current from the selected tap 24. The tap driver circuit 96 includes a plurality of tap driver transistors 98, each driver transistor 98 being connected between one of the taps 24 and an appropriate ground select line 100, there being a pair of the select lines $100_X$ and $100_Y$ associated with the respective tablet coils $22_X$ and $22_Y$. The shift register 86 has at least as many stages as the number of taps 24 on the longest of the coils 22. Each of the ground lines 100 is selectively connected to ground by a grounding transistor 102 in response to corresponding axis enable signals X and Y (described herein), the grounding transistors being designated $102_X$ and $102_Y$. In configurations of the apparatus 10 wherein the number of stages of the shift register 86 matches the number of taps 24 on each of the coils $22_X$ and $22_Y$, there would be a pair of the driver transistors 98 activated from each output of the shift register 86, one of the transistors 98 sinking current from a tap 24 of one tablet coil 22 and the grounded select line 100. The tablet coils $22_X$ and $22_Y$ are driven in alternate cycles of the clock divider 84, the output /TLD driving an axis divider 104 for producing complementary cycle outputs X and Y, the cycle outputs X and Y activating, respectively, the grounding transistors $102_X$ and $102_Y$.

The up/down counters $82_X$ and $82_Y$ are driven at variable frequency by a variable frequency oscillator (VCO) 106 in response to the sensor outputs 60 and 66 as described herein. As indicated in FIG. 4, the stylus amplifier 58 is implemented as an AC coupled pair of high-speed operational amplifiers 108, designated $108_A$ and $108_B$, the stylus coil 36 being connected between a passively generated reference voltage VR and a non-inverting input of the first amplifier $108_A$, the voltage VR also being used as a reference for the second amplifier $108_B$, the AC sensor output 60 being produced by the second amplifier $108_B$. A synchronous demodulator 110 is used in place of the demodulator 62 of FIG. 1 for rejecting out of phase components of the AC sensor output 60. The demodulator 110 feeds a counterpart of the low-pass filter 64, designated 112 in FIG. 4, the filter 112 being relatively fast for rapid response of the DC sensor output 66 to the AC sensor output 60. The DC sensor output 66 is fed to a comparator circuit 114 for charging a capacitor 116 at a rate proportional to the extent the DC sensor output 66 (active low) goes a predetermined amount below a reference voltage 118, the reference voltage 118 being produced by a passive low frequency filter 120 that is driven by the AC sensor output 60. Thus the reference voltage 118 represents an average DC value of the AC sensor output 60, the filter 120 having a much slower response than the low-pass filter 112. The comparator circuit 114 is very sensitive to changes in the DC sensor output 66, but compensates for DC offset drift such as might be introduced by the amplifier $108_B$ because the low frequency filter 120 is resistively coupled to the AC sensor output 60. An exemplary and preferred configuration of the low frequency filter 120 has a response time on the order of 1 ms, while the low-pass filter 112 has a response time of 0.025 ms, successive ones of the taps 24 being activated at intervals of approximately 2 ms.

The VCO 106 is operative over a frequency range of from DC to above 1 MHz, having an output inverter 122 that is driven by a fast (Baker-clamped) comparator 124, the comparator 124 being responsive to a voltage V at the capacitor 116 and having positive feedback from a feedback inverter 126 that is fed by the VCO output from the inverter 122. The output of the feedback inverter 126 is also connected to the capacitor 116 through a diode 128, the diode 128 providing a discharge path for the capacitor 116, the voltage V at the capacitor 116 increasing when a current in excess of a threshold current is produced by the comparator circuit 114, and decreasing when the VCO output of the inverter 122 is high. Also, the VCO 106 is gated by a VEN signal (described below) that is connected to the capacitor 116 by a diode 130, the VCO output of the inverter 122 being held at ground when the VEN signal is low, the diode 128 then preventing the voltage V at the capacitor 116 from rising. Thus the VCO 106 clocks the counters 82 at rates proportional to the magnitude of the DC sensor output 66, whenever the output 66 is sufficiently large and the VEN signal is also high.

The VEN signal is arbitrarily held high until a lock signal Z (further described below) is activated for permitting the counters 82 to stabilize upon initial entry of the stylus assembly 18 within the fields 34 of the coil assembly 12. When the lock signal Z is active, the VEN signal is responsive to an enable flip-flop 132 that is momentarily set during a terminal count sequence of the down counter 80 by a /TOUT signal from a "carry" output of the counter 80, the flip-flop 132 being clocked by an ST output from an intermediate stage of the counter 80. In the exemplary circuit configuration of FIG. 4, the ST output is from the ninth stage of the (12 stage) counter 80, thus activating the VEN signal for 256 μs following activation of the /TOUT signal, 256 μs corresponding to the period for four tap selections by the shift register 86. A /PO signal is activated during the second half cycle of the ST output that activates the enable flip-flop 132, the /PO signal resetting a first direction flip-flop 134, a DN signal from the flip-flop 134 being fed to a second direction flip-flop 136 for producing the direction signal CDN synchronously with the VCO output. Thus the counters 82 count downwardly during the first half of VEN (when the lock signal Z is active), then upwardly during the second half of VEN. Thus once lock is achieved, the VCO 106 operates only during an interval of time that is equivalent to the duration of four selections of taps 24 by the shift register 86 and the associated tap driver circuit 96. Accordingly, in each axis cycle (X or Y) beginning with activation of the /TLD output of the counter 84, the counter 82 retains its prior value until the /TOUT signal is activated by underflow of the down-counter 80, the down-counter 80 having previously been set with the contents of the counter 82 by the /TLD signal for delaying the VEN signal until approximately two tap selections prior to a time associated with a previously determined position of the stylus assembly 18. Selection between the data from the counters $82_X$ and $82_Y$ to be loaded into the down-counter 80 is effected by an axis selector 138 in response to the X signal from the axis divider 104, whereby the down-counter 80 is loaded with X and Y position data in alternate axis cycles. Upon activation of the VEN signal, and in the presence of a sufficiently large output from the stylus 18 as described above, the counter 82 commences counting down at a rate proportional to the DC sensor output 66 until the CDN signal goes low (on the first VCO pulse after the midpoint of the VEN signal) at which point the counter 82 counts upwardly until termination of the VEN signal, at which point the counter 82 holds a new coordinate position measurement for that axis.

Counterparts of the latch circuit 56, designated $56_X$ and $56_Y$ in FIG. 4, are loaded with the X and Y coordinate data from the counters $82_X$ and $82_Y$ subsequent to termination of the respective count sequences. Conveniently, this can be effected for each axis during activation of the other axis. Arbitrarily, the midpoint of the inactive intervals is used for loading the latch circuits 56, respective XLD and YLD strobe signals for the latch circuits 56 being enabled by an SR16 output of the shift register 86, gated with the opposite Y and X signals from the axis divider 104. In the circuit of FIG. 4, each of the latch circuits 56 is implemented with 16 data bits, including 12 bits of position data, the lock signal Z, and a pen down signal PDN, two unused bits being available for future use. The signal PDN is generated by a switch circuit 140 that is connected to a push-button switch 142 on the stylus assembly 18, the switch 142 providing a mouse "click" or similar function whereby an operator of the apparatus 10 can signal the location of the stylus point 39 at particular features of the drawing 20, for example.

Operation of the control circuit 40 of FIG. 4 is illustrated in the exemplary timing diagram of FIG. 7, wherein the AC sensor output 60 is labeled "AC". As shown in FIG. 7, AC is active during six tap selections of the coil $22_X$ (X active) immediately following activation of SR16, and during six tap selections of the coil $22_Y$ (X inactive). In this example, the stylus point 39 would be slightly to the right of midway between the 20th and 21st taps 24 in the X direction of the coil $22_X$. Accordingly, the AC signal bursts are shown as being asymmetrical about the tap selection transitions of the shift register clock SRC, the burst during X being concentrated to the right of the transition to the 20th taps 24 of the coil $22_X$, the other burst being concentrated to the left of the transition to the 8th tap 24 of the coil $22_Y$ slightly below midway between the 7th and 8th taps 24 in the Y direction of the coil $22_Y$.

In the above example, and assuming that the lock signal Z is active, the initiation of the /PO signal (and the midpoint of the VEN signal) follows the centroid of that portion of the stylus signal 138 that lies within the period of activation of the VEN signal. Thus the stylus signal 38 is advantageously ignored when the selected tap 24 is more than two positions from the stylus point 39, thereby facilitating uniform response of the apparatus 10 to positions of the stylus point 39 approaching the end extremities 26 of the coils 22. As also shown in FIG. 4, the coil buffer circuit 88 is gated with the VEN signal for significant power savings while the lock condition is maintained. For example, in the 32-bit configuration of the drive shift register 36, the power consumption by the coil 22 is reduced to approximately one-eighth when lock is achieved. Even using the 8 tap configuration of the coil 22 shown in FIG. 1 with an 8-bit configuration of the shift register 86, an approximately 50 percent power savings is possible.

More importantly, the gating of the stylus signal 38 as described above advantageously enhances the tolerance of the apparatus 10 to variations of the stylus axis 37 from being normal to the tablet surface 14. As shown in FIG. 2, the stylus coil 36 has a coil diameter D (which is preferably greater than the turn spacing l) and a coil height H, the midpoint of which is located a coil distance C from the stylus point 39. A first experimental prototype of the apparatus 10 has been built and tested, the relevant dimensions of the stylus assembly 18 being approximately D=0.25 inch, H=0.2 inch (200 turns of wire), and C=0.40 inch. Similarly, the coil assembly 12 of the first experimental prototype was fabricated with the relevant dimensions being approximately l=0.10 inch, S=0.30 inch, d=0.10 inch, and t=0.20 inch. Although the stylus signal 38 is somewhat insensitive to variations in the orientation of the stylus axis 37 from being perpendicular to the tablet surface 14, when the VCO 106 is gated as described above, there is a marked improvement in the immunity of the control circuit 40 to such variations.

Based on further testing of and modifications to the first experimental prototype, it is believed that when the VCO 106 is enabled for a period corresponding to four cycles of the shift register clock SRC, a high degree of immunity to tipping of the stylus assembly 18 is achieved approximately when $D \geq S \cong C$.

As discussed above, the VEN signal to the VCO 106 is forced high continuously until occurrence of the lock signal Z. As further shown in FIG. 4, a pair of lock flip-flops, designated $144_X$ and $144_Y$, are set during corresponding axis intervals when at least a predetermined number of pulses are produced by the VCO prior to underflow of the down-counter 80. This condition is produced when the DC sensor signal 66 is significantly large for sufficiently charging the capacitor 116 above the current threshold discussed above in connection with the comparator 114 when a coil tap 24 is selected that is approximately two tap positions from the stylus point 39. The occurrence of the predetermined number of pulses is detected by a 8-bit lock shift register 146 that is clocked by every fourth VCO pulse prior to occurrence of the /TOUT signal by a VCO divider 148; thus the predetermined number of VCO pulses is 32 for occurrence of the lock signal Z.

Importantly, the output of the lock shift register 146 is useful for providing a digital Z-axis indication of the proximity of the stylus point 39 to the tablet surface 14, by appropriate connections to the otherwise unused inputs of the latch circuits 56.

With further reference to FIGS. 5 and 6, a wireless configuration of the stylus assembly 18 has the stylus coil 36 shorted through a shunt reactance, which can be a shunt capacitor 150 as shown in FIG. 5, or a direct shorting connection. In this configuration, current induced in the stylus coil 36 loads the transmitter coil 22. The stylus signal 38 is generated by a current sensing resistor 152 that is connected between each grounding transistor 102 and ground, variations in the current from the selected taps 24 resulting from the proximity of the stylus coil 36 to the selected tap 24. As further shown in FIG. 5, a counterpart of the push button switch 142 is connected across a portion of the stylus coil 36 for permitting an appropriate counterpart of the switch circuit 140 (not shown) to generate the PDN signal in response to operation of the push button switch 142 by phase discrimination. Alternatively a variable resistance counterpart of the push button switch 142, designated pressure sensor 154, can be connected in series with the shunt capacitor 150 as shown in FIG. 6, the pressure sensor 154 being responsive to the pressure between the stylus point 39 and the tablet surface 14. The mechanical connection between the pressure sensor 154 and the stylus point 39 can be by any means known to those skilled in the art.

Alternatively, and with further reference to Fig. 8, improved rejection of stray noise and electrical fields is achieved using a dual counterpart of the stylus coil 36, coil portions 36a and 36b being wound bi-filar and connected through a shielded cable 155 to the stylus amplifier 58, the amplifier 58 being configured as a balanced differential input amplifier for producing the AC sensor output 60 as shown in FIG. 8.

With further reference to FIG. 9, an alternative configuration of the coil assembly 12 has the transmitter coils 22 formed with oppositely wound winding components 22a and 22b, only one transducer axis being depicted for clarity. The winding component 22a is similar in form to the winding $22_X$ of FIG. 1 and having end terminations 26a tap nodes 24a, the component 22b (shown by dashed lines) being wound in an opposite direction and having end terminations 26b and tap nodes 24b. Tap selection in the coil configuration of FIG. 9 may be effected in a variety of ways, FIG. 9 further illustrating one preferred selection circuit. In particular, the end terminations 26a are driven from the coil buffer circuit of FIG. 4, the end terminations 26b are grounded through counterparts of the coil terminators 46 of FIG. 1, and selected tap nodes 24a and 24b are shorted together by counterparts of the grounding transistors 102, designated selector transistors 102ab.

In the coil configuration of FIG. 9, current flows simultaneously from the buffer circuit 88 through the end extremities 26a in opposite directions toward the selected tap node 24a, then in opposite directions toward the selected. selected tap node 24b, through the end extremities 26b, thence through the coil terminators 46 to ground. The coil configuration of FIG. 9 advantageously generates a desired magnitude of the fringing field 34 using only approximately half of the coil current required for the coil configuration of FIG. 1. Also, wiring connections to the end extremities 26 and the tap nodes 24 carry current in opposite directions along parallel paths for cancellation of stray fields that would otherwise be produced by the wiring. Moreover, the oppositely wound coil components 22a and 22b themselves produce the fringing field 34 more uniformly across the tablet surface 14 of the coil assembly 12

With further reference to FIG. 10, in configurations of the control circuit 40 wherein the coil 22 is driven by a constant current, as in the configurations of FIGS. 4 and 9, wireless operation of the stylus assembly 18 can be effected by sensing variations in the voltage across the coil 22, instead of sensing variations in the current as in the configuration of FIG. 5. As shown in FIG. 10, a voltage divider 156 is connected between the end extremities 26 (26a in FIG. 9) of the coil 12 for sensing an average coil voltage, the stylus amplifier 58 comparing the average coil voltage with a counterpart of the oscillator output, designated OSC, for sensing variations in loading of the transmitter coil 22 by the stylus coil 36. As shown in Fig. 10, a decoupler 157 is provided between the filter 90 and the current waveform driver 92 of the coil buffer circuit 88 for producing the OSC signal.

With further reference to FIG. 11, instead of the transistor coil current being simultaneously driven in opposite directions toward or away from the selected tap 24, the current can be driven one direction during a first predetermined interval, then in the opposite direction during a second predetermined interval. For this purpose, the current waveform drivers 92 of the coil buffer circuit 88 are gated with corresponding interval transistors 92a, one of the transistors 92a being driven in response to the DN signal, the other transistor 92a being driven in a complementary interval by a /DN signal from the first direction flip-flop 134. In FIG. 11 the DN and /DN signals are also gated with the lock signal Z for enabling alternate interval activation of the current waveform drivers 92 once the lock condition is achieved. Thus the current in each transmitter coil 22 flows from one end extremity 26 to the selected tap node 24 during the first half of the VEN interval, then the current flows from the other end extremity 26 in the opposite direction toward the selected tap node 24 during the second half of the VEN interval, because the steering diodes 94 are cross-connected to the coil extremities 26 of the transmitter coils $22_X$ and $22_Y$ as shown in FIGS. 4 and 11.

In the version of the control circuit 40 shown in FIG. 1, the decoder 50 can be implemented with generic 54/74 series integrated circuit logic such as a CMOS 74C42 decoder, the outputs of which are connected through readily available non-inverting tri-state drivers to corresponding ones of the coil taps 24. Similarly, the counter 52 can be implemented as three or more cascaded 74C161 binary counters, and the latch 56 can be implemented with any of many circuits known to those having skill in the art that are readily commercially available from a variety of sources.

In the version of the control circuit 40 shown in FIG. 4, the down-counter 80, the up-down counters 82, the counter 84, and the counter 148 can each be implemented with appropriate numbers of generic 4 bit 54/74 series '191 up/down counter integrated circuits. Similarly, the shift registers 86 and 146 can be implemented with '164 8-bit shift register circuits. The selector 138 can be implemented with a '157 quad 2-input multiplexer, and the axis divider 104 and the flip-flops 132, 134, 136, and 144 can be implemented with '74 dual D flip-flop circuits. The bipolar transistors, including bipolar transistors within the operational amplifiers 104 can be 2N2222 (NPN) and 2N2907 (PNP) types.

The tablet coils 22 can be formed on a plastic core 158, being wound with fine copper wire such as 36 AWG enameled coil wire. Proper alignment of the coil portions can be facilitated by locating grooves appropriately on the core 158. Alternatively, the tablet coils 22 can be formed using methods known to those skilled in the art of multi-layer circuit boards. These include printed conductors, using 1, 2, 3, or 4 layers and etched conductors using 1, 2, 3, or 4 layers. Implementation of 2 layer dual-coil circuits can be achieved also by slight coil distortion required to interleave traces from one side of the printed circuit assembly to the other side and back again. Any electromagnetic distortion caused by interleaving coils can be easily corrected by correction and table look-up methods commonly known to those skilled in the art.

With further reference to FIGS. 12-16, the tablet coils $22_X$ and $22_Y$ are operable in a receiving mode instead of the transmitting mode described above. In the configuration of FIGS. 12-16, an active counterpart of the stylus assembly 18, designated stylus assembly 160, includes a bi-filar counterpart of the stylus coil, designated coil 162. The stylus coil 162 is driven by a gated resonant circuit 164 that is powered at approximately 3.0 volts by a pair of miniature batteries 166, the coil 162 being provided with a relatively large diameter ferrite core 169 for low power operation. The circuit 164, together with the coil 162 and the batteries 166 is packaged within a tubular barrel 167 of the stylus assembly 160.

The circuit 164 includes a timer 168 for intermittently powering a center tap node 170 of the coil 162, a pair of end nodes 172 being connected to the collectors of a pair of drive transistors 174 and to opposite sides of a resonant capacitor 175. The emitters of the transistors 174 are connected to a current set resistor 176 for driving the coil 162 at a desired drive current. Positive feedback is provided by a feedback capacitor 177, the transistors 174 being biased by a connection between the batteries 166, or by other suitable means. When the center tap node 170 is activated by the timer 168, the circuit 164 resonates at a stylus frequency $F_S$ of approximately 500 KHz. The stylus assembly 160 also includes a tip switch 178 and a barrel switch 180, the switches 178 and 180 having appropriate connections to the timer 168 for selectively determining a first timer interval $T_1$ and a second timer interval $T_2$ as indicated in the timing diagram of FIG. 14. During the first timer interval $T_1$, power to the center tap node 170 of the coil 162 is disabled, a total peak-to-peak voltage of approximately 4.0 volts appearing across the end nodes 172 during the second timer interval $T_2$. In accordance with the present invention, the timer 168 is operable in a normal mode wherein $T_1$ has a duration of approximately 250 μs when the tip switch 178 is open (the stylus assembly 160 being lifted from the tablet surface 14), and a duration of approximately 125 μs when the tip switch 125 is closed (when the stylus point 39 is pressed against the tablet surface 14). The interval $T_2$ has a duration of approximately 2 ms when the barrel switch 180 is open, and a duration of approximately 1.8 ms when the barrel switch 180 is closed. In further accordance with the wherein $T_1$ is approximately 20 ms when the tip switch 178 is opened, $T_1$ being 125 μs when the tip switch 178 is closed. In the low power mode, the second timer interval $T_2$ is controlled between approximately 2 ms and approximately 1.8 ms as described above in connection with the normal mode. This dual mode operation of the timer 168 is summarized in Table 1. The intervals $T_1$ and $T_2$ can be further modulated for relaying complex binary data from the stylus assembly 160 to the control circuit 40.

TABLE 1

| Switch Positions | | Normal Power Mode | | Low Power Mode | |
|---|---|---|---|---|---|
| Tip Switch | Barrel Switch | $T_1$ | $T_2$ | $T_1$ | $T_2$ |
| Open | Open | 250 μs | 2 ms | 20 ms | 2 ms |
| Closed | Open | 125 μs | 2 ms | 125 μs | 2 ms |
| Open | Closed | 250 μs | 1.8 ms | 20 ms | 1.8 ms |
| Closed | Closed | 125 μs | 1.8 ms | 125 μs | 1.8 ms |

As further shown in FIG. 12, a radiated magnetic field from the stylus coil 162 is detected by the tablet coils 22x and 22y, and by an auxiliary coil 181, the auxiliary coil 181 feeding a synch circuit 182 as further described below. In an exemplary configuration shown in FIG. 12, the tablet coils 22 are sequentially connected to the respective ground select lines 100x and 100y through the tap driver transistors 98 in a manner similar to that shown in FIG. 4, it being understood that appropriate base current limiting resistors (as shown at 183) are series connected between the shift register 86 of FIG. 4 and the driver transistors 98. The end extremities 26 of each of the coils 22 are connected through respective end resistors 184 to separate end nodes 186 for each axis, designated end node 186x and 186y. Each of the end nodes 186 is connected through an isolator diode 188 to a single signal node 190, the signal node 190 being loaded toward a positive supply voltage (+5V) by a resistor 192. As also shown in FIG. 12, an RC clamp network 194 is additionally connected between the signal node 190 and ground for clamping transient coil voltages when the tap driver transistors 98 are all inactive. As thus described, a counterpart of the stylus signal 38 is provided at the signal node 190 in response to magnetic fields produced by coil 162 of the stylus assembly 160, the stylus signal 38 varying in accordance with the position of the stylus assembly 160 and the operation of the shift register 86.

Figures 15, 16, 22, 23, 24:
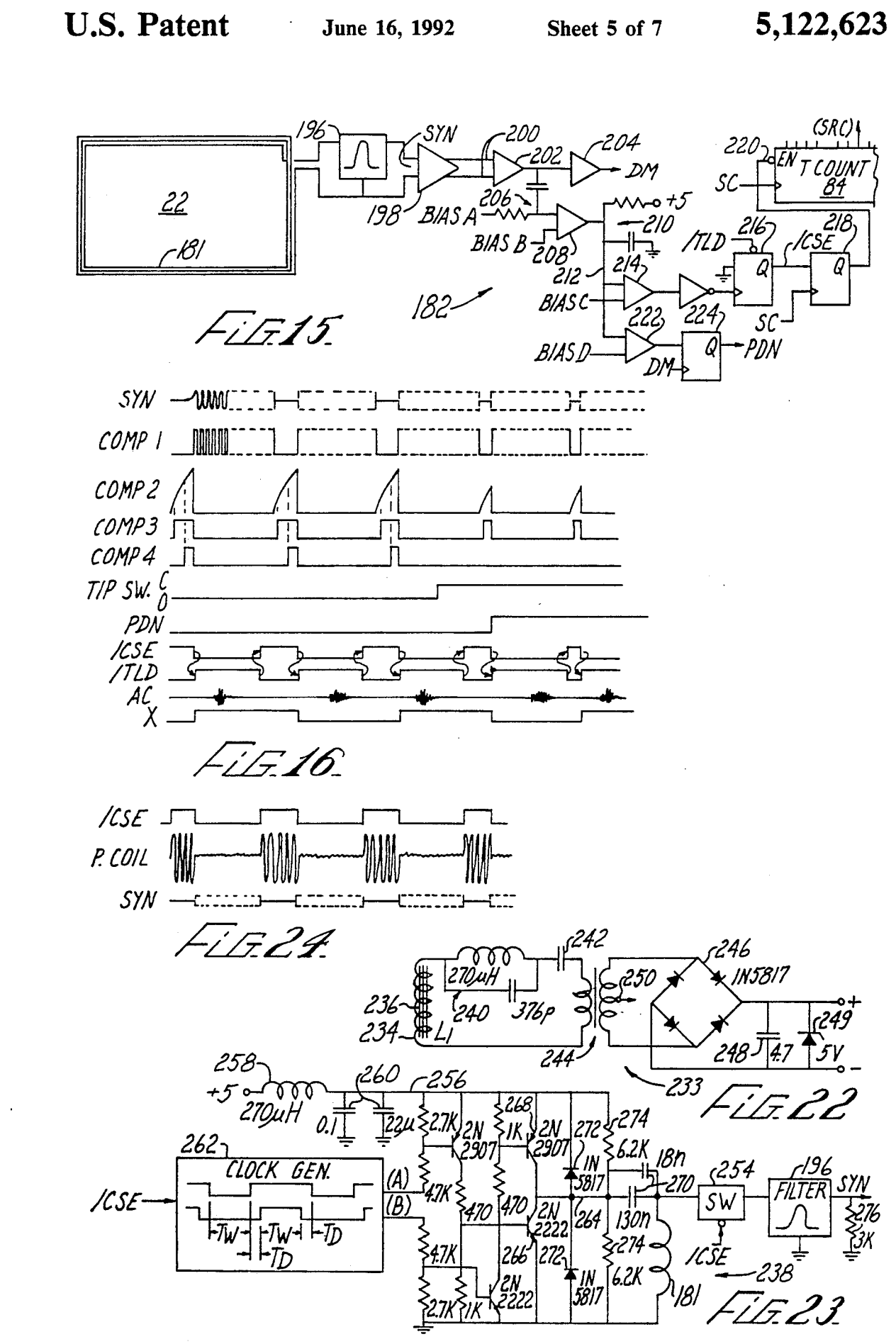

As shown in FIG. 15, the auxiliary coil 181, which can have typically 8-100 turns of a suitable conductor proximately in the coil plane 16 and surrounding the coils 22, is connected to the synch circuit 182 through a resonant band pass filter 196, further described below. The filter 196 feeds a pre-amplifier circuit 198 having balanced output connections 200 to complementary inputs of a first synch comparator 202. The first synch comparator 202 drives a buffer 204 for producing a counterpart of the demodulator signal DM (at the stylus frequency $F_S$) for use by the synchronous demodulator 110 of FIG. 4. The first comparator 202 also drives a differentiating filter 206 that feeds a second comparator 208, the second comparator 208 driving an integrating filter 210 for producing a synch ramp output 212. A third comparator 214 is responsive to the synch ramp output 212 for clocking a synch flip-flop 216 that produces a low level counter scan enable (/CSE) signal upon the falling edge of the output of the third comparator 214, the /CSE signal being reset (high) by the /TLD output of the clock divider 84. As further shown in FIG. 15, the /CSE signal feeds the data input of an enable flip-flop 218 that is clocked by the SC output of the oscillator 42, the enable flip-flop 218 feeding a heretofore unused enable input 220 of the clock divider 84. The synch ramp output 212 also drives a fourth comparator 222, the fourth comparator 222 feeding a pen down latch 224 for producing a counterpart of the PDN signal, described above. The timing of the synch circuit 182 is shown in FIG. 16, wherein the PDN signal is shown being activated in response to an absence of pulses from the fourth comparator 222 when the timer interval $T_1$ is sufficiently shortened by operation of the tip switch 178. Operation of the barrel switch 180 is detected by similar means (not shown) that is responsive to variations in the second timer interval $T_2$.

An important aspect of the present invention is low power operation of the stylus assembly 160 for providing a combination of extended life of the batteries 166 and a small package size of the stylus assembly 160. For this purpose, the timer 168 can be made using very low power CMOS technology. For example, the timer 168 can include a conventional CMOS implementation of the venerable 555 timer. Even lower power implementations using similar CMOS circuitry are available using contemporary technology. Further, the current required by the stylus coil 162 is reduced by configuring the coil 162 with high inductance and high Q. Thus the stylus coil 162 is preferably wound with many turns of very fine wire, the ferrite core 169 providing high Q. An exemplary configuration of the circuit 164 operating at a frequency of 500 KHz would have an inductive reactance $X_L$ of approximately 100 ohms, with Q being approximately 100. Thus the resonant impedance would be approximately 10K ohms, approximately 400 $\mu$a being supplied through the current set resistor 176. This is equivalent to approximately 1.5 mW of power from the batteries 166, allowing 100 $\mu$a for the timer 168. A higher Q would permit even lower power operation. Further, and with reference to FIGS. 17 and 18, the geometry of the stylus coil 162 and the ferrite core 169 can be modified for reducing the power by increasing the inductance of the stylus coil 162. As shown in FIG. 17, the ferrite core 169, which includes a forwardly facing stem portion 225 having a core diameter D', and an enlarged head portion 226 having a head diameter D", the head portion 226 being located proximate the coil 162 at an end thereof facing away from the tablet surface 14. As shown in FIG. 18, a further increase in inductance is facilitated by the addition of a ferrite ring member 228 that contacts the head portion 226, the ring member 228 also extending partially over the stylus coil 162. As further shown in FIG. 18, a clearance passage 230 is formed between the ring member 228 and the head portion 226 for feeding leads of the stylus coil 162.

With further reference to FIG. 19, the stylus assembly 160 can include a variable resistor 232 connected in the circuit 164 in place of the tip switch 178 in a manner similar to that discussed above in connection with FIG. 6, for controlling the first timer interval $T_1$ in response to pressure against the stylus point 39.

With further reference to FIG. 20, the transducer apparatus 10 in the configuration of FIGS. 12-16 having the active stylus assembly 160 can include the tablet coil 22 generally configured as in FIG. 9, having the oppositely wound winding components 22a and 22b. In FIG. 20, the oppositely wound winding components 22a and 22b are designated $22a_X$ and $22b_X$ (for the coil $22_X$), and $22a_Y$ and $22b_Y$ (for the coil $22_Y$). Separate counterparts of the end nodes $186_X$ and $186_Y$ are connected to each of the end extremities 26 of the winding components 22a and 22b of the respective coils $22_X$ and $22_Y$, through counterparts of the end resistors 184, the end nodes being designated $186a_X$, $186b_X$, $186a_Y$, and $186b_Y$. The end nodes 186a and 186b are connected separately through counterparts of the isolator diodes 188 to counterparts of the signal node, designated signal nodes 190a and 190b for producing a balanced counterpart of the stylus signal, designated 38'. The stylus signal 38' is thus produced in opposite polarity components across the signal nodes 190a and 190b in response to magnetic coupling from the stylus coil 162, due to the winding components 22a and 22b being oppositely wound. A counterpart of the RC clamp network, designated 194', is diode-coupled between ground and each of the signal nodes 190, the network 194' including an NPN emitter follower for limiting the voltage of each of the signal nodes 190 to approximately Vss, where Vss is a reduced voltage powering CMOS circuitry of the control circuit 40, including the shift register 86, Vss being approximately 3 volts. When the stylus point 39 is proximate the tablet surface 14, the magnitude of the stylus signal 38' is greatest when the stylus assembly 160 is closest to a selected (active) pair of the tap nodes 24a and 24b.

Alternatively, separate counterparts of the stylus amplifier 58 can be used for simultaneously scanning the tablet coils $22_X$ and $22_Y$, the control circuit 40 also having corresponding counterparts of the demodulator 110 and the associated analog circuitry for producing separate X and Y counterparts of the VCO signal. Thus the speed or time resolution of the transducer apparatus 10 is doubled at only slightly increased complexity.

The sequential activation of the tap driver transistors 98 effectively produces a moving center tap (in the configurations of FIGS. 4 and 12), and a pair of moving center taps (in the configurations of FIGS. 9 and 20) on each of the coils 22.

With further reference to FIGS. 21-24, a preferred configuration of the transducer apparatus 10 is operative for magnetically transmitting power to the stylus assembly 160, designated 160' in FIG. 21, from the auxiliary coil 181. As shown in FIG. 21, the stylus assembly 160' includes a power receiver circuit 233 having a power coil 234, the power coil 234 being wound on a cylindrical ferrite core 236, the coil 234 and the core 236 being coaxially spaced behind the ferrite core 169 for avoiding excessive loading of the stylus coil 162. The space between the core 169 and the core 236 provides a preferred location for the tip switch 178. A core suitable for use as the ferrite core 236 is available as part No. R650-3B from Phillips Corp. of Canoga Park, Calif. Such cores have a relative permeability of 800, being about 0.234 inch diameter, 1.969 inch long.

The auxiliary coil 181 is powered during the first timer interval $T_1$ by a power driver circuit 238 as shown in FIG. 23 and further described below. As shown in FIG. 22, power from the auxiliary coil 181 is received by the power coil 234, the power coil 234 being fed through a shunt-resonant LC filter 240 and a series-connected capacitor 242 to the primary of a step-up coupling transformer 244. The secondary of the coupling transformer 244 drives a full wave diode bridge circuit 246 to which is connected a filter capacitor 248 and a shunt-regulating zener diode 249 for providing positive (+) and negative (−) voltage connections to the circuit 164 for driving the stylus coil 162 as described above. Biasing for the drive transistors 174 can be provided by a suitable resistive voltage divider 250. The coupling transformer 244 and an inductor L2 of the resonant LC filter 236, on respective ferrite cores, designated 236t and 236l, are located behind the ferrite core 236, the other components of the power circuit 233 being located on a thin circuit board 252 within the stylus assembly 160' to the rear of the ferrite cores 236. Cores suitable for use as the ferrite cores 236l and 236t are available as pot cores, part No. 704PA160 from TDK Corp., such cores typically standing less than 0.2 inch high.

As further shown in FIG. 23, a solid state switch 254 is connected between the auxiliary coil 181 and the band pass filter 196, the switch 254 being responsive to the /CSE for disconnecting the filter 196 during the first timer interval $T_1$. The power driver circuit 238 drives the auxiliary coil 181 at an intermediate power frequency $F_P$ which can be on the order of from about 10 KHz to 10 MHz from a suitable power supply (+5V, not shown) during the first timer interval $T_1$. The power driver circuit 238 has a power bus 256 that is fed through a filter inductor 258, the bus 256 also having a pair of filter capacitors 260 connected thereto. The power driver circuit 238 also includes a gated clock generator 262 having A and B outputs that are activated at the frequency $F_p$ (generated from the oscillator 42) in response to the /CSE signal, an inverted counterpart of the output A periodically driving an output node 264 of the power circuit 238 toward ground potential by means of an NPN transistor 266. An inverted counterpart of the output B similarly periodically powers the output node 264 from the power bus 256 in a complementary manner by a PNP transistor 268. The output node 264 is coupled to the auxiliary coil 181 by a pair of coupling capacitors 270. Unwanted commutation current between the power bus 256 and ground through the transistors 266 and 268 is avoided by configuring the clock generator 262 for providing a delay interval $T_D$ between the transitions of each of the outputs A and B, one or the other of the transistors 266 and 268 conducting current to the auxiliary coil 181 through the capacitors 270 during symmetrical main power intervals $T_W$ as indicated in FIG. 23. Further, the delay $T_D$ can be adjusted or selected for adjusting a power level of the power circuit 238, the power level adjustment having an effect similar to impedance matching. A pair of the freewheeling diodes 272 are connected between the output node 264 and the power bus 256 and ground, respectively, for minimizing power loss by allowing current to continue in the auxiliary coil 181 at commencement of the delay intervals $T_D$.

In the power receiver circuit 233, the voltage generated in the power coil 234 is provided (effectively) in series with both inductances (leakage and magnetizing) of the power receiver circuit 233. As long as the series impedance of the auxiliary coil 181 is much greater (10 times or greater) than the magnitude of a total leakage inductance impedance of the power receiver circuit 233 and the power driver circuit 238, a Thevenin equivalent circuit looks like a voltage source in series with a transformed low resistance magnetizing inductance of the circuit combination which is loosely magnetically coupled between the auxiliary coil 181 and the power coil 234. Under these conditions, regardless of what primary and/or secondary coupling and/or loading situation exists, the total inductance of the power coil 234 is (effectively) in series with the load presented by the power receiver circuit 233. This fact will be important in achieving maximum power transfer by eliminating the reactance of the inductances. It is believed that the loose coupling and the resulting disproportionate distribution of magnetizing inductance and/or leakage inductance of the auxiliary coil 181 which makes this approximation of practical use. Also, for consistent "cancellation" of the inductances, the inductances of the power receiver circuit 233 and the power driver circuit 238 ought to be nearly constant.

Because the coupling process is so inefficient, and because it is desired to limit overall power consumption, it is important to get a large proportion of the power coupled to the power receiver circuit 233. According to the present invention, the reactive (inductive) components in the circuits 233 and 238 are separately cancelled. The capacitor 242 of the power receiver circuit 233 and the capacitor 270 of the power driver circuit 238 serve this purpose. It is desired that by setting the values of the capacitors 242 and 270 appropriately, the reactances of the series inductances are exactly matched at the power frequency $F_P$ so that all that is left is the circuit DC resistances.

Once the dimensions of the auxiliary coil 181 and the power coil 234 have been set, the most significant free-choice factor is believed to be the power frequency $F_P$. At first, it would seem that the higher the frequency, the better the design (until the frequency gets too close to the stylus frequency $F_S$ and it becomes difficult to separate the signal paths using LC filters). Ordinarily, a higher power frequency means easier filtering, fewer turns being required on the inductances (to stand off the applied voltage), and perhaps, smaller components.

Contrarily, it has been discovered that for a given resistance, the larger reactive component, the tighter must be the tolerances on the components for cancellation of the reactive components at the same current. For example, if the inductances in the power receiver circuit 233 are 7.5 mH, at 75 KHz this is an impedance of 3.5K ohms. Resonating this inductance with 601 pF leaves the resistance of the power receiver circuit 233 only. However, if the inductance changes by only 0.1%, there is a residual 3.5 ohms (reactive) which is in series with the circuit resistance of perhaps 3.0 ohms. Thus the net current capability would be reduced to 0.67 of its original value (a 33% decrease). By using a lower power frequency such as 30 KHz in the same circuit (7 mH, 4.03 nF instead of 644 pF, 3.0 ohms DC resistance) gives only an 8.5% decrease in the current. Moreover, the higher the frequency, the higher reactance of the magnetizing component of the inductance of the auxiliary coil 181. The higher the reactance, the more difficult it becomes to have the resistance of the auxiliary coil 181 much greater than the reactance of the power coil 234. A further benefit of the lower frequency is the ability to move further away from the frequencies where self-resonance is a problem. The cost of using the lower frequency is probably a few more primary turns.

An alternative consideration of the requirement that the resistance of the auxiliary coil 181 be much greater than the reactance of the power coil 234 is that if the resistance is low enough, even though the inductive reactance of the auxiliary coil 181 will not be constant for differing positions of the stylus assembly 160', the power driver circuit 238 can be resonated in the condition of worst pickup in the power receiver circuit 233. It is believed that at better locations and/or orientations of the stylus assembly 160' where more magnetic flux is captured by the ferrite core 236, more current is available even though the reactance cancellation is not perfect. In this discussion it is assumed that the loss due to deviation away from resonance is more than offset by the greater magnetic flux captured and the higher overall flux available at the same power input to the power driver circuit 238 because of reduced resistance of the auxiliary coil 181.

The coupling transformer 244 is included in the power receiver circuit 233 because the voltage across the power coil 234 is insufficient for direct rectification to achieve 3.0 volts or more. It has been unexpectedly discovered that harmonics that would normally be injected into the power coil 234 from the diode bridge circuit 246 are absent. Upon reflection, it is believed that such harmonics are suppressed because of the resonance at the power frequency $F_P$. Accordingly, the current through the coupling transformer 244 is sine wave at the frequency of power filtering, regardless of the load presented by the circuit 164. Consequently, the average rectified open circuit voltage from the coupling transformer 244 is the same as the DC voltage at the filter capacitor 248, except for resistive losses. Thus it is preferred that the power frequency $F_P$ be in a relatively low range, from approximately 20 Khz to approximately 100 KHz. More preferably, the frequency $F_P$ is between approximately 25 KHz and approximately 50 KHz.

Operation of the auxiliary coil 181 and the solid state switch 254 is shown in FIG. 24, wherein the auxiliary coil 181 is driven by the power driver circuit 238 during the first timer interval $T_1$, a sinusoidal peak-to-peak voltage of approximately 8 volts at the power frequency $F_P$ appearing across the auxiliary coil 181. When the /CSE signal is active (generally during a major portion of the second timer interval $T_2$), the solid state switch 254 couples a low-level received signal (at the stylus frequency $F_S$) from the auxiliary coil 181 to the band pass filter 196 for processing by the synch circuit 182 as described above. A breadboard of the circuit 164 for driving the stylus coil 162 has been built and tested for frequency stability at temperatures between 20° C. and 45° C., a frequency change of less than 0.06% being measured. Accordingly, a close tolerance ceramic filter is preferred for recovering the received signal at the auxiliary coil 181 from ambient noise and processor noise.

Ceramic filters are mass-produced for other applications, including band-pass filtering at 455 KHz. Such a device suitable for use as the band-pass filter 196 is available at low cost as model FSFU455A, a 3-terminal band-pass filter having a center frequency of 455 KHz±2 KHz (the stylus frequency $F_S$), and having a 10 KHz±3 KHz band width, and a maximum center frequency loss of 5 dB, available from muRata Erie North America, Inc., of Smyrna, Ga. This device is configured for operation with source and load impedances of 3.0K ohms. Accordingly, a pair of output resistors 274 (6.2K ohms each) are connected between the output node 264 and the power bus 256 and ground, respectively, for providing the desired input impedance to the filter 196. The resistors 274 also bias the output node 264 to approximately 2.5 volts when the transistors 266 and 268 are both inactive so that the received signal from the auxiliary coil 181 cannot be loaded by either of the diodes 272.

The coupling capacitors 270 have a total capacitance that is intended to produce series resonance with the auxiliary coil 181 at the power frequency $F_P$. By limiting the reactive portion of these impedances, most of the voltage available through the power driver circuit 238 is delivered to the real part of the impedance of the auxiliary coil 181. Thus a large proportion of the power into the power driver circuit 238 appears as current across the resistance of the auxiliary coil 181. Accordingly, the capacitors 270 are carefully selected for matching the reactance of the auxiliary coil 181. As further shown in FIG. 23, a filter resistor 276 is connected for loading the band pass filter 196 at the desired impedance of 3.0K ohms.

An important feature of the present invention is that the operation of the power circuits 233 and 238 is multiplexed with operation of other portions of the control circuit 40. Thus, during operation of the shift register 86, no power switching is going on. Conversely, during power transmissions between the power driver circuit 238 and the power receiver circuit 233, no location signals are generated. The same low frequency of approximately 250 Hz which is the basic sample time of the X-Y location process is used for switching between these processes. When no locations signals have been detected, the lock signal Z being inactive, the power driver circuit 238 is active about 90% of the time and the stylus signal 38' (and the synch circuit 182) is active about 10% of the time. When some location signal has been detected (the lock signal Z active), the timing switches to approximately 50% for each. In normal operation, the filter capacitor 248 is required to provide power to the circuit 164 for driving the stylus coil 162 during periods of approximately 2 ms while the power driver circuit 238 is inactive. Conversely, after periods in which the stylus assembly 160' is not proximate the coil assembly 12, it is desired that the filter capacitor 248 be rapidly charged, the driver circuit 238 being active about 90% of the time.

Figure 25:
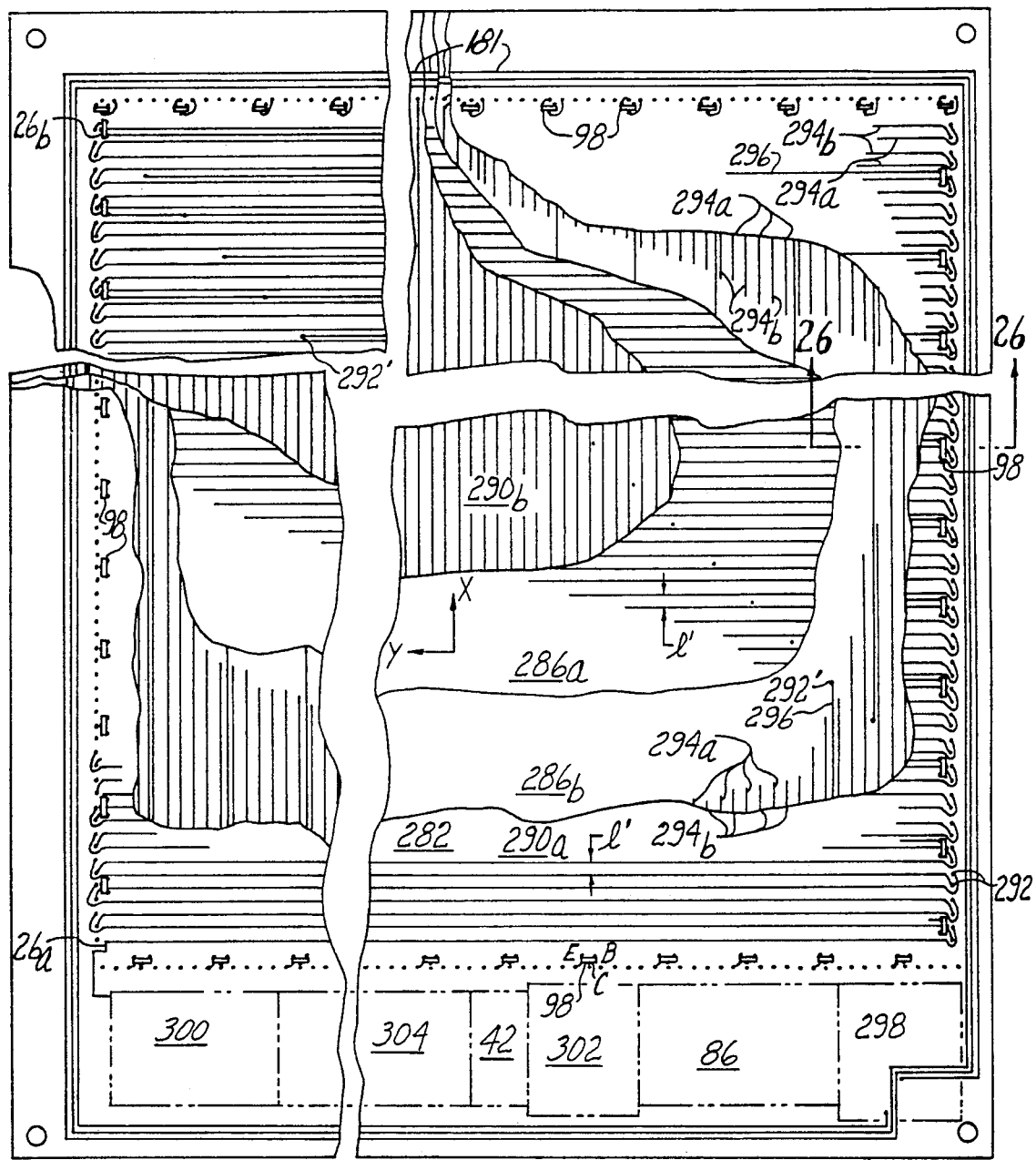
FIG. 25 is a bottom plan view of a circuit module for implementing the apparatus of FIG. 1.
Figure 26:
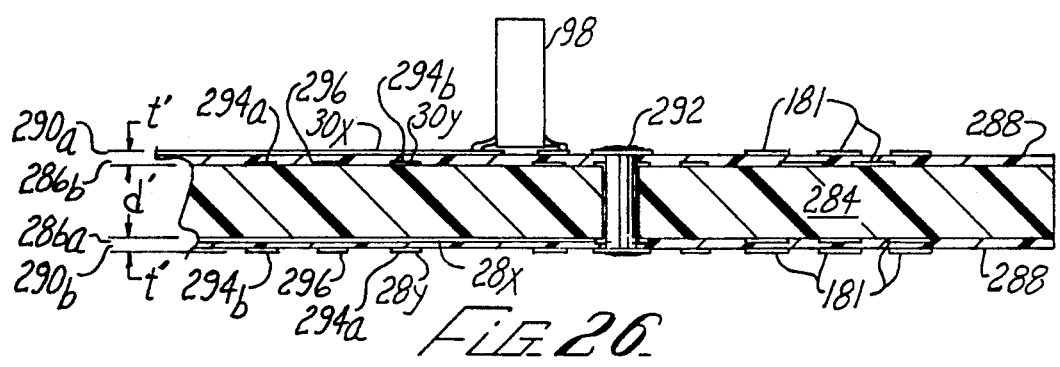
FIG. 26 is a sectional detail view of the module of FIG. 25 on line 26—26 thereof.

With further reference to FIGS. 25 and 26, a second experimental prototype of the apparatus 10 of the present invention has been fabricated generally in the configuration of FIGS. 4, 9, 12, and 21–24. This second prototype includes a module board 278 implementing a preferred configuration of the coil assembly 12, including the tablet coils $22_X$ and $22_Y$ configured as in FIGS. 9 and 20, and the auxiliary coil 181, together with the control circuit 40 having the synch circuit 182 of FIG. 15 and the power driver circuit 238 of FIG. 23. As shown in FIGS. 25 and 26, the module board 278 includes a 4-layer, circuit board 280, the tap driver transistors 98 being spaced about the perimeter of a tablet region 282 of the board 280. The board 280 is formed according to conventional multi-layer circuit technology, and includes a substrate 284 having a thickness d' (that roughly corresponds to the thickness d of FIG. 2) and having first and second interior trace layers, designated 286a and 286b, formed thereon, over which are formed a pair of insulating layers 288. Another pair of the trace layers, designated exterior trace layers 290a and 290b, are formed on respective ones of the insulating layers 288, the exterior trace layer 290a being formed opposite the substrate 284 from the interior trace layer 286a. Each insulating layer 288 together with its associated exterior trace layer 290 has a trace layer thickness t'. Similarly, the exterior trace layer 290b is formed opposite the substrate 284 from the interior trace layer 286b. As shown in FIG. 25, the tablet coil $22_X$ is formed by the interior trace layer 286a and the exterior trace layer 290a, a plurality of conductive through-holes 292 forming the side portions 32 by appropriate electrically conductive connections between the respective layers, the interior trace layer 286a forming the top portions 28 of the tablet coil $22_X$, the exterior trace layer 290a forming the bottom portions 30 of the coil $22_X$. Similarly, the tablet coil $22_Y$ is formed by the interior trace layer 286b and the exterior trace layer 290b. The drive transistors 98 are "surface mounted" on the exterior trace layer 290a, being packaged in the conventional SOT-23 configuration, appropriate auxiliary connecting traces being provided on the trace layer 290a.

As further shown in FIG. 25, the tablet region 282 has parallel has parallel spaced arrays of the respective top and bottom coil portions 28 and 30 in alternating trace portions 294 correspondingly designed 294a and 294b. The oppositely wound coil components 22a and 22b are equally spaced by a trace spacing l', the trace spacing l' being half of the turn spacing l. In the second prototype, the trace spacing l' is 0.1 inch, there being a total of 90 of the trace components 294 in the coil $22_X$ and 80 of the components 294 in the coil $22_Y$. In FIG. 25, the tap driver transistors 98 are staggered on opposite sides of the tablet region 282 for selectively electrically connecting adjacent pairs of the through-holes 292. In particular, the transistors 98 are spaced apart by three pairs of the holes 292 on each side of the region 282, the trace pattern of the trace layer 290a to which the transistors 98 are connected providing that the connected adjacent pairs of the through-holes 292 effectively short facing ones of the top and bottom coil portions 28 and 30. Appropriate connections from the drive shift register 86 are made by respective base trace components 296 that are spaced between adjacent ones of the trace components 294, with appropriate counterparts of the through-holes 292, designated 292', completing the connections.

The module board 278 also includes circuit components of the synch circuit 182 and the power driver circuit 238 as indicated at 298, the oscillator 42, the shift register 86, and circuitry associated with the signal nodes 190, as indicated at 300. Also, the module board 278 includes a custom large scale integrated circuit 302 incorporating the remaining CMOS portions of the control circuit 40. Analog circuitry of the demodulator 110, the comparator circuit 114, the low frequency filter 120, and the comparator 124 is included as indicated at 304. The circuit board 280 of the second prototype has an overall length in the X direction of approximately 12.5 inches, an overall width in the Y direction of approximately 10 inches, the substrate thickness d' being approximately 0.047 inch, the insulating layers 288 (under the exterior trace layers 290) having a thickness of approximately 0.008 inch, the trace layer thickness t' including the associated exterior trace layers 290 being approximately 0.01 inch.

Portions of the auxiliary coil 181 are formed in each of the trace layers (three turns in each of the layers 286a and 290, two turns in the layer 286b, the coil 181 having 11 turns. Each turn of the coil 181 is formed as a 0.030 inch wide etch of 2 oz. copper (approximately 0.0016 thick) and having a DC resistance of approximately 5.6 ohms. The inductance of the auxiliary coil 181 is approximately 120 μH. Accordingly, the coupling capacitors 270 were selected for a total capacitance of 94 nF (82 nF + 12 Nf) for reactance cancellation at the power frequency $F_P$ of 30.0 KHz.

Figure 27:
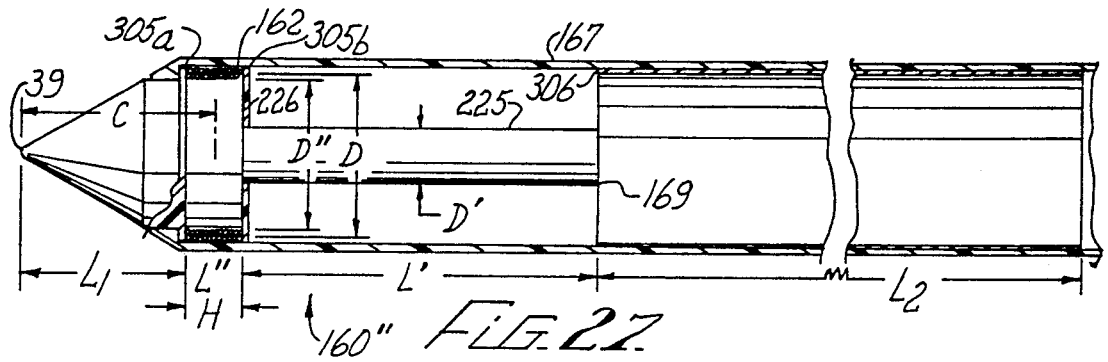
FIG. 27 is a fragmentary sectional side view showing another alternative configuration of the apparatus of FIG. 13.

In further experimentation, a more preferred configuration of the stylus assembly 160 has been discovered that provides a focused electromagnetic response for improved performance with respect to pen-tilt correction and reduced sensitivity to peripheral metallic surfaces and structures. With further reference to FIG. 27, the improved performance results from having the stylus coil 262 wound on a counterpart of the head portion 226 of the ferrite core 169, the core 169 being axially inverted from the configuration of FIGS. 17 and 21 in the stylus assembly 160, designated 160" herein. In the configuration of FIG. 27, the core 169 has the stem portion 225 extending a stem length L' behind the coil 162, the head portion 226 having an axial length L" that corresponds to the length H of the stylus coil 162, the head portion 226 also being located a distance $L_1$ from the stylus point 39, the distance $L_1$, corresponding to the coil distance C less half the coil height H. The stylus coil 162 is axially confined within the length L' by a pair of non-conductive flange members 305, designated front flange member 305a and rear flange member 305b, the flange members 305 being affixed to the head portion 226 by a suitable adhesive. As further shown in FIG. 27, the stylus point 39 is formed integrally with the front flange member 305a.

The combination of the relatively large coil diameter D and similarly large head diameter D" with the relatively small coil height H provides reduced magnetic susceptability (or transmission) from the side of the stylus coil 162, and increased susceptability (or transmission) from the front end of the coil. The stem portion 225 further enhances the performance of the stylus assembly 160" by increasing the inductance of the stylus coil 162, and by further focussing the received (or transmitted) field. The focusing action increases as D'/D" increases and as L' increases. The experiments have yielded improvements in focusing power of from approximately two to approximately three times that previously obtained from the configuration of FIGS. 13, 17, and 18, with the ferrite core 169 having D=0.25 inch, D'=0.09 inch, L'=0.6 inch, L'=0.1 inch. In this configuration, the distance $L_1$ is preferably in the range of 0.2 to 0.3 inch.

Yet further improved focusing of the magnetic coupling is achieved by a conductive tubular shield 306 that is mounted within the stylus assembly 160" immediately behind the ferrite core 169. The tubular shield 306 may be conveniently formed from a suitable conductive foil such as aluminum (approximately 0.002 inch thick), closely fitting the barrel 167 for accommodating other components of the stylus assembly 160', and having a shield length $L_2$. The focusing action described above further increases as the length $L_2$ increases, the length $L_2$ being preferably on the order of 2 inches.

Figure 28:
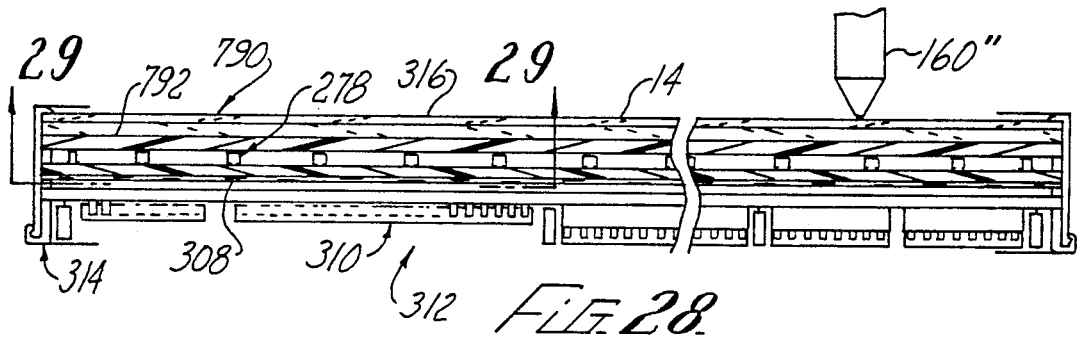
FIG. 28 is a fragmentary sectional elevational view showing the circuit module of FIG. 25 in a graphic tablet unit.
Figure 29:
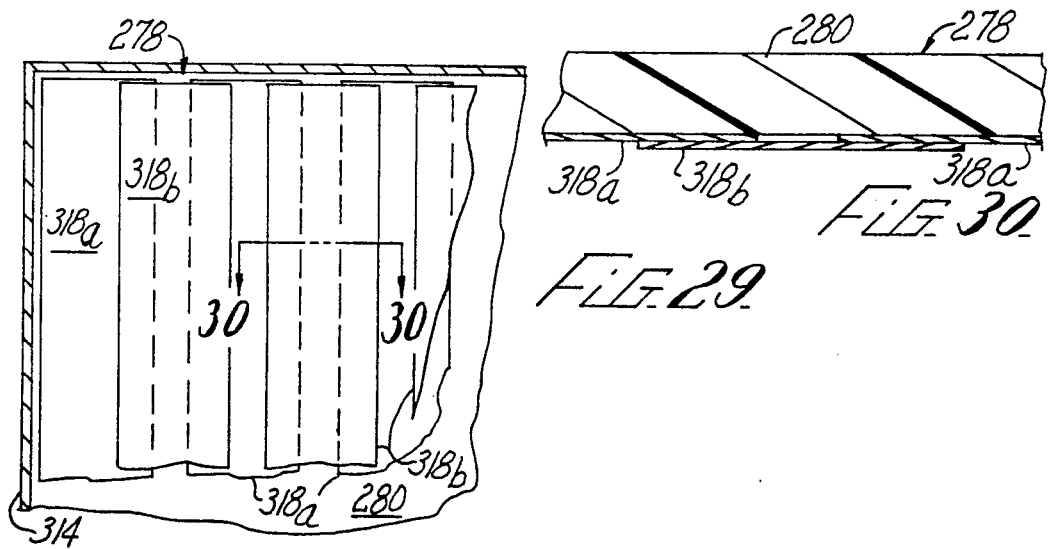
FIG. 29 is a fragmentary sectional plan view of the unit of FIG. 28 on line 29—29 thereof.
Figure 30:
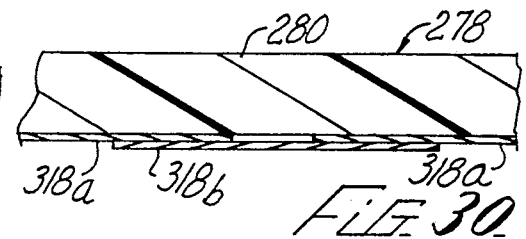
FIG. 30 is a sectional detail view of the unit of FIG. 25 on line 30—30 of FIG. 29.

With further reference to FIGS. 28-30, the module board 278 is provided with a shield structure 308 for further enhancing the strength of the received stylus signal 38'. As shown in FIG. 28, the module board 278 is combined with the display panel 792 of the display unit 790, together with a computer module 310 in a graphic tablet unit 312, the shield structure 308 also acting as an EMI shield for blocking radiated signals from the computer module 310. The components of the tablet unit 312 are connected in a frame assembly 314, the display panel 792 also being provided with a protective sheet 316, which can be formed of glass, the sheet 316 also providing the tablet surface 14. In this configuration, the shield structure 308 is mounted to the module board 278, facing the computer module 310.

As best shown in FIGS. 29 and 30, the shield structure 308 has an interrupted sheet configuration, which may be conveniently formed by overlapping conductive foil strips 318, designated inner strips 318a and outer strips 318b. The inner strips 318a, having a suitable adhesive, are first applied to the circuit board 280 in parallel spaced relation. The outer strips 318b, also having a suitable adhesive, are similarly applied so as to overlap neighboring pairs of the inner strips 318a. The strips 318 can also be formed from aluminum foil as described above in connection with the tubular shield 306 of the stylus assembly 160'.

The shield structure 308 thus enhances operation of the auxiliary coil 181 as well as the tablet coil 22, especially in the presence of nearby radiated electromagnetic signals. The aluminum foil produces a continuous eddy-current in response to operation of the apparatus 10, which enhances the sensitivity of the magnetic coupling between the coils 22 and 181 of the circuit board 280 and the coils 162 and 234 of the stylus assembly 160" that are located opposite the module board 278 from the shield structure 308. Further, the shield structure 308 effectively blocks localized electromagnetic radiators of the computer module 310 from being picked up as stray noise by the tablet coil 22. Moreover, the segmented form of the shield structure 308 avoids undesirable shorting of the auxiliary coil 181 that might otherwise be produced by having a single solid sheet of metal in close proximity to the auxiliary coil 181, thereby enhancing the sensitivity of the auxiliary coil 181 to signals from the stylus coil 162.

Although the present invention has been described in considerable detail with reference to certain preferred versions thereof, other versions are possible. For example, there are several ways to implement analog and digital up/down integrators using operational amplifiers, transistors, timers, processors, analog switches, and combinations of such electronics. Similarly, there are several alternative ways to drive the tablet coil, including passive, active, constant current, AC drive at the ends, DC drive at the ends and AC drive modulation at the return, etc. The taps 24 can be connected to the return path via transistors, shift registers, or other electronic means.

Also, the shield structure 308 can be formed by etching opposite sides of a single conductive sheet. Therefore, the spirit and scope of the appended claims should not necessarily be limited to the description of the preferred versions contained herein.

What is claimed is:

1. A position transducer comprising:
   (a) helical electrically conductive tablet coil having a plurality of coil turns and first and second end extremities, and a plurality of coil tap nodes thereon, the coil tap nodes being spaced between the end extremities;
   (b) selector means for sequentially addressing selected ones of the coil tap nodes;
   (c) a transducer body movable in a first transducer direction relative to the tablet coil and having a stylus coil fixedly mounted thereto; and
   (d) oscillator means for producing a coil drive current in one of the tablet coil and the stylus coil;
   (e) circuit means connected to the selector means and responsive to the stylus coil for providing a first position signal, the first position signal representing the position of the transducer body relative to a first position reference, the first position reference being perpendicular to the first direction.

2. The transducer of claim 1, wherein the oscillator means is connected to the tablet coil, the coil drive current flowing in opposite directions on opposite sides of each selected tap node.

3. The transducer of claim 1, wherein the tablet coil comprises a pair of oppositely helically wound coil components, each of the components having a plurality of the coil tap nodes, the selector means sequentially connecting the coil components at corresponding ones of the coil tap nodes.

4. The transducer of claim 3, wherein the tablet coil comprises first and second trace layers, the first trace layer having a parallel spaced array of front coil portions, the second trace layer having a parallel spaced array of rear coil portions, alternate ones of the coil portions forming equally spaced portions of each of the oppositely wound coil components, each front coil portion being aligned with a rear coil portion of an oppositely wound coil component.

5. The transducer of claim 4, further comprising an array of conductive elements connecting each front coil portion to a corresponding rear coil portion of the same coil component, the conductive elements forming side coil portions of each of the coil components.

6. The transducer of claim 5, wherein adjacent pairs of the conductive elements comprise corresponding tap nodes of the oppositely wound coil components.

7. The transducer of claim 1, wherein the oscillator means is connected to the stylus coil for magnetically coupling a stylus field to the tablet coil, and the circuit means comprises a receiver node electrically coupled to the end extremities of the tablet coil, a receiver signal at the receiver node being responsive to the magnitude of the stylus field at the tablet coil.

8. The transducer of claim 7, wherein the tablet coil comprises a pair of oppositely helically wound coil components, each of the components having a plurality of the coil tap nodes, the selector means sequentially connecting the coil components at corresponding ones of the coil tap nodes.

9. The transducer of claim 8, wherein the circuit means comprises a balanced differential input amplifier, end extremities of the tablet coil components being coupled to complementary counterparts of the receiver node for feeding the amplifier, the amplifier rejecting stray electrical noise.

10. The transducer of claim 9, wherein the counterparts of the receiver node are coupled to respective end extremities of the coil components by corresponding diodes.

11. The transducer of claim 8, comprising a pair of the transmitter coils for dual-axis position measurements in alternating axis intervals, the end extremities of the coils being coupled to the differential amplifier through diode isolators.

12. The transducer of claim 7, further comprising an auxiliary coil proximately enclosing the tablet coil for providing an auxiliary signal in response to magnetic coupling from the stylus field.

13. The transducer of claim 12, further comprising means for synchronizing the circuit means to the auxiliary signal.

14. The transducer of claim 12, wherein the oscillator means is located within the transducer body, the transducer further comprising:
   (a) means for periodically driving the auxiliary coil at a power frequency;
   (b) power receiver means in the transducer body for powering the oscillator means by magnetic coupling from the auxiliary coil; and
   (c) means for periodically interrupting the power driver means for reception of the auxiliary signal.

15. The transducer of claim 14, wherein the power receiver means comprises:
   (a) a power coil;
   (b) rectifier means;
   (c) filter means connected between the rectifier means and the oscillator means; and
   (d) coupling means coupled between the power coil and the rectifier means, the coupling means being resonant with the power coil at the power frequency for canceling a reactance of the power coil at the power frequency.

16. The transducer of claim 14, wherein the power driver means comprises:
   (a) a complementary pair of driver transistors for sequentially switching a power node between a power bus voltage and ground at the power frequency;

(b) a gated clock generator circuit for separately controlling the driver transistors, the generator circuit including means for delaying activation of each of the driver transistors for a predetermined delay period following deactivation of the other driver transistor; and (c) a coupling capacitor connected between the coupling node and the auxiliary coil, the coupling capacitor being resonant with the auxiliary coil for canceling a reactance of the auxiliary coil at the power frequency.

17. The transducer of claim 14, wherein the power frequency is between approximately 10 KHz and approximately 10 MHz.

18. The transducer of claim 17, wherein the power frequency is between approximately 20 KHz and approximately 100 KHz.

19. The transducer of claim 17, wherein the power frequency is between approximately 25 KHz and approximately 50 KHz.

20. The transducer of claim 7, comprising threshold means for detecting a predetermined magnitude of the receiver signal, the threshold means providing a valid signal when the transducer body is aligned within a predetermined distance from the tablet coil.

21. The transducer of claim 20, wherein the oscillator circuit is operable in a burst mode having a burst duty cycle, the burst duty cycle being less than approximately 20 percent for conserving electrical power.

22. The transducer of claim 21, wherein the burst mode is terminated for at least a predetermined period of time upon occurrence of the valid signal.

23. The transducer of claim 7, wherein the circuit means further comprises:
(a) integrator means for summing a first-polarity component of the receiver signal during a first cycle interval, the integrator means also summing an opposite-polarity component of the receiver signal during a second cycle interval;
(b) latch means for latching a variable position signal, the position signal being representative of the location of the sequentially connected coil tap nodes along the tablet coil; and
(c) feedback means for activating the latch means in response to the integrator means, the first cycle interval terminating and the second cycle interval commencing upon activation of the latch means.

24. The transducer of claim 23, wherein the variable position signal is generated by an N-state counter, N being a multiple M of the number of the coil tap nodes of the tablet coil, the selector means decoding the N-state counter for connecting each of the coil tap nodes to the oscillator means during an interval group number of counter states, the interval group number corresponding to the multiple M.

25. The transducer of claim 23, wherein the integrator means comprises a bidirectional counter and a variable frequency oscillator, the frequency of the variable frequency oscillator being responsive to the magnitude of the receiver signal.

26. The transducer of claim 1, wherein the transducer coil is cylindrically helical about a coil axis and having front and back portions on opposite sides of the coil axis, the coil axis being parallel to the first transducer direction, the transducer further comprising means for guiding the body at a fixed probe distance t from the front portion of the coil.

27. The apparatus of claim 26, wherein the front and back portions of the transducer coil are spaced part by a winding distance d, the distance d being at least approximately 0.03 inches.

28. The transducer of claim 26, wherein the turns of the tablet coil are substantially uniformly spaced.

29. The transducer of claim 26, wherein the stylus coil is cylindrically symmetrical about a stylus axis, the transducer body defining a stylus point on the stylus axis, the stylus point moving at the probe distance t from the front portion of the coil.

30. The transducer of claim 29, wherein the tablet coil turns are spaced in the direction of the coil axis by a turn spacing l, the stylus coil having a diameter D and a length H, a central point within the stylus coil on the receiver axis being offset by a coil distance C from the stylus point, the coil distance C being approximately C = a complex function of (D, l, H, d and t) for permitting uniform operation of the transducer within a range of inclinations of the stylus axis relative to orthogonal alignment with the front portion of the coil.

31. The transducer of claim 30, wherein $D \geq S \approx C$.

32. The transducer of claim 30, further comprising means for gating the circuit means,
whereby the circuit means is responsive to the receiver coil during a sample interval only, a subset of the coil tap nodes being activated by the selector means during the sample interval for enhancing the uniformity of operation over the range of inclinations of the receiver axis.

33. The transducer of claim 32, wherein the duration of the sample interval is approximately equal to the time during which four of the coil tap nodes are selected by the selector means.

34. The transducer of claim 29, wherein the stylus coil comprises a pair of stylus coil components.

35. The transducer of claim 26, wherein the front coil portion is substantially planar, the means for guiding the body comprising a planar tablet surface for slidably supporting the body.

36. The transducer of claim 35, wherein the tablet coil is a first coil, the transducer comprising a second tablet coil, the second tablet coil being orthogonally supported relative to the first tablet coil.

37. The transducer of claim 35, further comprising an electronic graphic display unit, the display unit forming the tablet surface.

38. The transducer of claim 37, wherein the display unit is visually responsive to movement of the transducer body relative to the tablet surface.

39. The transducer of claim 26, wherein the tablet coil is a first tablet coil, the transducer comprising a second tablet coil, the second tablet coil being orthogonally supported relative to the first tablet coil, the front portions of the coils being substantially coplanar.

40. The transducer of claim 1, wherein the tablet coil includes a plurality of the turns between each of the coil tap nodes.

41. A position transducer comprising:
(a) electrically conductive first and second tablet coils, each having a plurality of substantially uniformly spaced coil turns and opposite end extremities, and a plurality of coil tap nodes spaced between the end extremities, the tablet coils being cylindrically helical about respective first and second coplanar coil axes and having front and back portions on opposite sides of the coil axes;

(b) selector means for sequentially addressing selected ones of the coil tap nodes for variably coupling the stylus field;

(c) a transducer body movable relative to the tablet coils and having a stylus coil cylindrically symmetrical about a receiver axis and fixedly mounted to the transducer body, the transducer body defining a stylus point on the receiver axis;

(d) means for guiding the body at a predetermined probe distance from the front portions of the transducer coils;

(e) oscillator means in the transducer body for producing a coil drive current in the stylus coil for radiating a magnetic stylus field therefrom;

(f) circuit means connected to the selector means and responsive to the stylus coil for providing first and second position signals, the position signals representing position coordinates of the transducer body relative to the tablet coils, the circuit means comprising:
  (i) a receiver node electrically coupled to end nodes of the tablet coils, a receiver signal at the receiver node being responsive to the stylus field at the selected tap node of the tablet coil; and
  (ii) wireless means for synchronizing the circuit means to the oscillator means; and (g) wireless means for periodically powering the oscillator means from the circuit means.

42. A method for measuring a coordinate position, comprising the steps of:

(a) providing a helical tablet coil having end extremities and a plurality of coil tap nodes spaced between the end extremities;

(b) providing a stylus coil in a movable transducer body;

(c) locating the stylus coil at the coordinate position for producing a receiver signal responsive to the magnetic coupling;

(d) driving an AC oscillator for producing a magnetic field between the tablet coil and the stylus coil;

(e) sequentially selecting a plurality of the coil tap nodes for variably magnetically coupling the tablet coil and the stylus coil; and (f) detecting a centroid position of the receiver signal, the centroid position being representative of the coordinate position.

43. The method of claim 42, further comprising the steps of:
  (a) periodically interrupting the AC oscillator;
  (b) modulating a first timer interval during which the oscillator is interrupted in response to a movable member on the transducer body; and
  (c) monitoring the first timer interval for detecting a position of the movable member.

44. The method of claim 43, wherein the movable member is a first movable member, the method including the further steps of:
  (a) modulating a second timer interval during which the oscillator is operational in response to a second movable member on the transducer body; and
  (b) monitoring the second timer interval for detecting a position of the second movable member.

45. The method of claim 43, including the further step of powering the AC oscillator by magnetic coupling to the transducer body during the first timer interval.

46. In a position transducer having a stylus that is wirelessly coupled to a tablet circuit, the tablet circuit being responsive to movement of the stylus relative thereto, the improvement comprising:
  (a) timer means in the stylus; and
  (b) means for synchronizing the tablet circuit in response to the timer means.

47. The transducer of claim 46, wherein the tablet circuit is operative for generating respective X and Y coordinate measurements of the position of the stylus in corresponding scan intervals, the scan intervals being sequentially initiated in response to the timer means.

48. The transducer of claim 46, the stylus further comprising auxiliary control circuit means, the timer means being responsive to the auxiliary control circuit means, the tablet circuit including means for generating at least one auxiliary output in response to the timer means, the auxiliary output corresponding to operation of the auxiliary control circuit means.

49. The transducer of claim 48, wherein the auxiliary control circuit means comprises at least one operator-controlled switch on the stylus.

50. The transducer of claim 49, wherein the stylus has a body and a stylus point, the operator-controlled switch being responsive to axial pressure against the stylus point.

* * * * *